United States Patent
Ajan

(10) Patent No.: US 7,470,475 B2
(45) Date of Patent: *Dec. 30, 2008

(54) MAGNETIC RECORDING MEDIUM AND MAGNETIC STORAGE APPARATUS

(75) Inventor: Antony Ajan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

This patent is subject to a terminal disclaimer.

(21) Appl. No.: 11/125,868

(22) Filed: May 10, 2005

(65) Prior Publication Data

US 2005/0227123 A1  Oct. 13, 2005

Related U.S. Application Data

(63) Continuation of application No. PCT/JP03/06081, filed on May 15, 2003.

(51) Int. Cl.
*G11B 5/66* (2006.01)

(52) U.S. Cl. ...................................................... 428/831

(58) Field of Classification Search .................. None
See application file for complete search history.

(56) References Cited

U.S. PATENT DOCUMENTS

| | | | |
|---|---|---|---|
| 5,344,706 A | | 9/1994 | Lambeth et al. |
| 5,650,237 A | * | 7/1997 | Satoh et al. ............... 428/611 |
| 5,685,958 A | | 11/1997 | Futamoto et al. |
| 5,693,426 A | | 12/1997 | Lee et al. |
| 5,700,593 A | * | 12/1997 | Okumura et al. ......... 428/831.2 |
| 5,866,227 A | | 2/1999 | Chen et al. |
| 6,010,795 A | | 1/2000 | Chen et al. |
| 6,139,981 A | | 10/2000 | Chuang et al. |
| 6,567,236 B1 | * | 5/2003 | Doerner et al. ........... 360/97.01 |
| 6,586,116 B1 | * | 7/2003 | Bian et al. .................. 428/651 |
| 6,596,409 B2 | * | 7/2003 | Bian et al. .................. 428/611 |
| 6,623,874 B2 | | 9/2003 | Kanbe et al. |
| 6,824,896 B2 | * | 11/2004 | Lee et al. ................. 428/832.2 |
| 7,005,202 B2 | | 2/2006 | Kanbe et al. |
| 7,354,665 B2 | * | 4/2008 | Ajan et al. ............... 428/832.1 |
| 2001/0016272 A1 | | 8/2001 | Bian et al. |
| 2002/0064691 A1 | | 5/2002 | Kanbe et al. |
| 2005/0142390 A1 | * | 6/2005 | Ajan et al. ............. 428/694 TS |

FOREIGN PATENT DOCUMENTS

| | | |
|---|---|---|
| GB | 2 295 159 | 5/1996 |
| JP | A 7-73441 | 3/1995 |
| JP | A 8-147661 | 6/1996 |

(Continued)

OTHER PUBLICATIONS

Tang et al.; Microstructure and Texture Evolution of Cr Thin Films with Thickness; J. Appl. Phys. vol. 74, pp. 5025-5032; Oct. 15, 1993.

(Continued)

*Primary Examiner*—Holly Rickman
(74) *Attorney, Agent, or Firm*—Greer, Burns & Crain, Ltd.

(57) ABSTRACT

A magnetic recording medium includes a seed layer made of one of AlRu and AlV, a magnetic recording layer made of a CoCr alloy, and an underlayer made of the other of AlRu and AlV, where the underlayer is disposed between the seed layer and the magnetic recording layer.

12 Claims, 22 Drawing Sheets

FOREIGN PATENT DOCUMENTS

| | | |
|---|---|---|
| JP | A 2002-117531 | 4/2002 |
| JP | A 2002-183926 | 6/2002 |

OTHER PUBLICATIONS

Kataoka et al.; Magnetic and Recording Characteristics of Cr, Ta, W and Zr Pre-Coated Glass Disks; IEEE Trans. on Magn., vol. 31, No. 6, pp. 2734-2736; Nov. 1995.

Oh et al.; A Study on VMn Underlayer in CoCrPt Longitudinal Media; IEEE Trans. Magn., vol. 37, No. 4; pp. 1504-1507; Jul. 2001.

Abarra et al.; Longitudinal Magnetic Recording Media with Thermal Stabilization Layers; Applied Physics Letters, vol. 77, No. 16, pp. 2581-2583; Oct. 2000.

Doemer et al; Demonstration of 35 Gbits/in$^2$ in Media on Glass Substrates; IEEE Trans. on Magn. Vo. 37, No. 2, pp. 1052-1058; Mar. 2001.

* cited by examiner

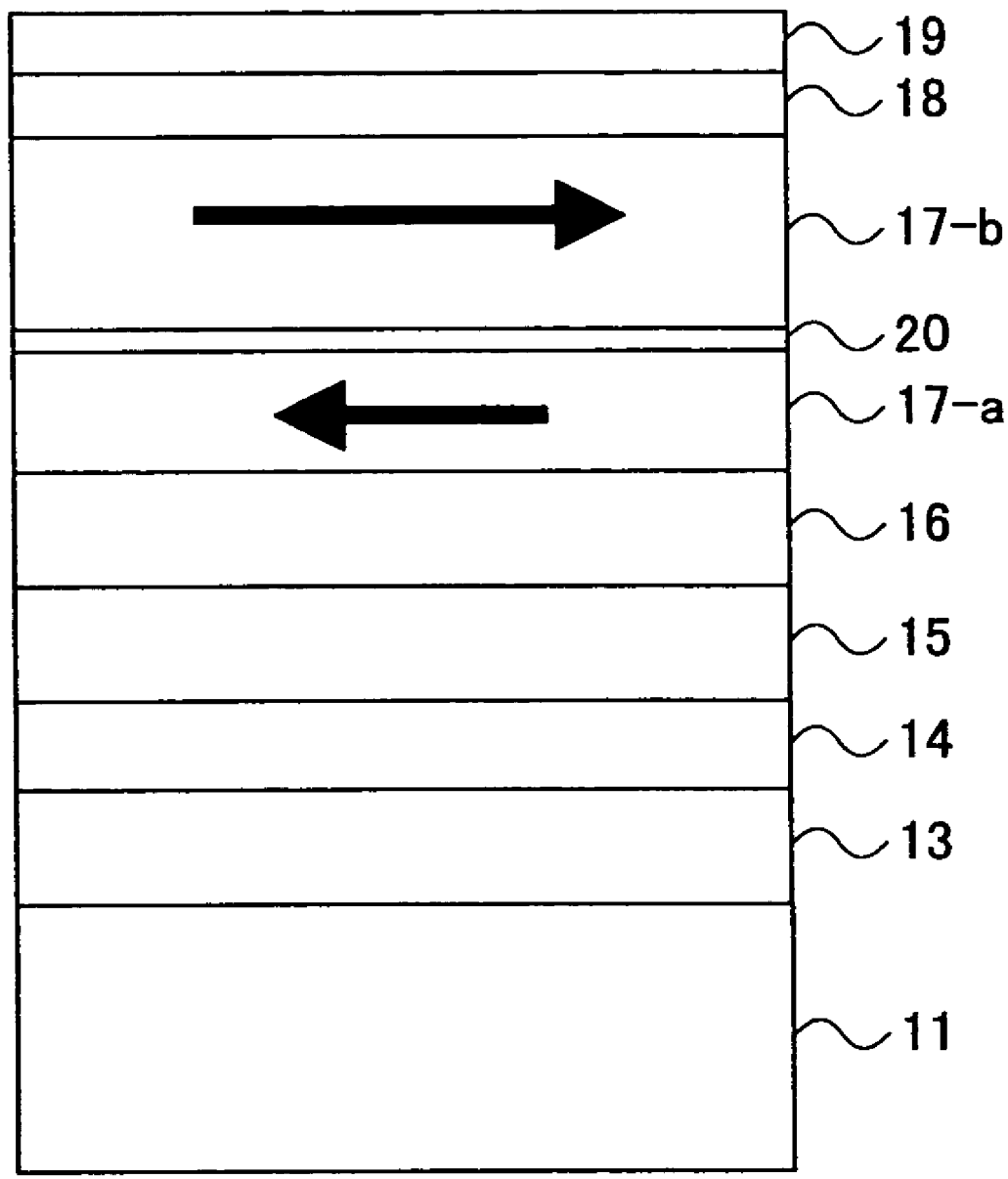

N2= 8% applied field (kOe)

N2= 10% applied field (kOe)

MAGNETIC RECORDING MEDIUM AND MAGNETIC STORAGE APPARATUS

BACKGROUND OF THE INVENTION

This application is a continuation application filed under 35 U.S.C. 111(a) claiming the benefit under 35 U.S.C. 120 and 365(c) of a PCT International Application No. PCT/JP2003/006081 filed May 15, 2003, in the Japanese Patent Office, the disclosure of which is hereby incorporated by reference.

The PCT International Application No. PCT/JP2003/006081 was published in the English language on Nov. 25, 2004 under International Publication Number WO 2004/102539 A1.

1. Field of the Invention

The present invention generally relates to magnetic storage media and magnetic storage apparatuses, and more particularly to a longitudinal magnetic recording medium having a seed layer and suited for a high-density recording, and to a magnetic storage apparatus which uses such a magnetic recording medium.

2. Description of the Related Art

A typical longitudinal magnetic recording medium includes a substrate, a seed layer, a Cr or Cr alloy underlayer, a CoCr alloy intermediate layer, a Co alloy magnetic layer where the information is written, a C overlayer, and an organic lubricant, which are stacked in this order. Substrates that are being presently used include NiP-plated AlMg substrates and glass substrates. The glass substrate is more popular due to its resistance to shock, smoothness, hardness, light weight, and minimum flutter especially at a disk edge in the case of a magnetic disk.

In a first example shown in FIG. 1, on a glass substrate 1 is formed an amorphous layer 3 made of NiP. The NiP layer 3 is preferably oxidized. On the NiP layer 3 is grown an underlayer made up of two essentially Cr underlayers 4 and 5 with a (002) texture on which a magnetic layer 7 is deposited. The second Cr underlayer 5 usually has a larger lattice parameter than the first Cr underlayer 4. The magnetic layer 7 has a (11$\bar{2}$0) crystallographic orientation, and may be made up of a single layer or multiple layers that are in direct contact and behave magnetically as one magnetic layer. An interlayer 6 made of a CoCr alloy may be disposed between the magnetic layer 7 and the Cr underlayers 4 and 5. To enhance the adhesion of NiP to glass, elements such as Cr may be alloyed with NiP or a separate adhesive layer 2 made essentially of Cr may be employed. However for metallic substrates like Al, it is not required to employ this adhesive layer 2. On the magnetic layer 7, a protective layer 8 made of C, and an organic lubricant layer 9 are deposited for use with a magnetic transducer such as a spin-valve head.

In a second example shown in FIG. 2, the structure is similar to that of FIG. 1. But in FIG. 2, the magnetic layer 7 is replaced by a plurality of layers 7-a and 7-b that are antiferromagnetically coupled through a spacer layer 10 made of Ru, so as to form the so-called synthetic ferrimagnetic medium (SFM). The first layer 7-a functions as a stabilizing layer, and the second layer 7-b functions as a main recording layer.

A third example shown in FIG. 3 utilizes a refractory metal seed layer 3-a made of Ta-M, where M is either nitrogen or oxygen. On the glass substrate 1 is formed a Ta-M seed layer 3-a either by reactive sputtering with Ar+$N_2$ or Ar+$O_2$ gas on which an underlayer 4 is deposited. The crystallographic orientation of (002) is mentioned in a U.S. Pat. No. 5,685,958 to Funtamoto et al., but the composition of the underlayer is limited to Cr or Cr alloy, and no mention is made of underlayers made of materials such as B2 structured materials, for example. The magnetic layer 7 is formed on the interlayer 6 or the underlayer 5 with a (11$\bar{2}$0) preferred orientation as in the first example described above.

The microstructure of the magnetic layer, which includes grain size, grain size distribution, preferred orientation and Cr segregation, strongly affects the recording characteristics of the magnetic recording medium. The microstructure of the magnetic layer is usually controlled by use of one or more seed layers and one or more underlayers, with suitable mechanical texturing of the substrate. Small grain size and small grain size distribution with excellent crystallographic orientation are desired for extending the longitudinal magnetic recording technology for the current densities on the order of 50 Gbits/in$^2$) and for the future recording densities of 100 Gbits/in$^2$ or greater.

A seed layer is usually closest to the substrate and aids primarily in promoting a desired crystallographic orientation on the subsequent layers such as an underlayer. The seed layer is most likely amorphous and made of NiP or B2 structured materials, while the underlayer is most likely crystalline and made of bcc structured materials such as Cr and has either a (002), (110) or (112) texture.

The most extensively used underlayer has been Cr or Cr alloys with Mo, Mn, V, Ti or W, where the Cr content is typically at least 70 at. % and the additives are most often for increasing the lattice parameter. This lattice parameter increase helps to reduce the lattice mismatch between the Cr underlayer and the Co alloy magnetic layer. These are usually deposited on mechanically textured or non-textured $Ni_{81}P_{19}$ on suitable substrates like glass or Al. Mechanical texturing invariably exposes NiP to air which oxidizes the film surface. Oxidation is important for the Cr to grow with a (002) in-plane texture which results in the subsequently deposited magnetic layer to have a (11$\bar{2}$0) crystallographic texture.

This is taken advantage of by a U.S. Pat. No. 5,866,227 to Chen et al., where a reactively sputtered NiP (with $O_2$) seed layer on a glass substrate is described. Typically, Cr is deposited at a substrate temperature Ts>180° C. to promote a (002) texture with no (110) peak in the XRD spectrum. Deposition at low temperature Ts may result in smaller grains but a (110) texture is developed. NiP does not adhere very well to glass, and an adhesive layer such as that described in a U.S. Pat. No. 6,139,981 to Chuang et al. can be used. On NiP seed layers, underlayer grain sizes on the order of 8 nm to 10 nm can be realized by using two Cr alloy layers and by reducing the total underlayer thickness to less than 10 nm. Increasing the total thickness tends to significantly increase the average grain size. For example, for a single layer of $Cr_{80}Mo_{20}$ with a thickness t=30 nm, the average grain size can be approximately 20 nm which is obviously inadequate for present day media noise requirements.

Tang et al., "Microstructure and texture evolution of Cr thin films with thickness", J. Appl. Phys., vol. 74, pp. 5025-5032, 1993 also observed grain diameter increase with thickness. To achieve an average grain size less than 8 nm is difficult as further reduction of the underlayer thickness results in degradation of the magnetic layer c-axis in-plane orientation (IPO). Although the underlayer average grain size can be small, a few large grains occasionally occur on which two or more magnetic grains may grow. The effective magnetic anisotropy of such grains may be reduced if magnetic isolation is not complete.

Alternate approaches to reduce grain size include inclusion of B (boron) onto the CoCrPt matrix. B inclusion reduces the grain size of recording layer and substantially improves the signal-to-noise ratio and magnetic properties of the magnetic recording medium. However, adding very high percentage of B increases the fct phase and hence the crystallographic quality goes bad beyond a certain B percentage, especially over B concentration of 8%.

A U.S. Pat. No. 5,693,426 to Lee et al. describe ordered alloy underlayers with the B2 structure such as NiAl and FeAl. Ordered alloys with structures such as B2, $L_{10}$ and $L_{12}$ are expected to have small grain sizes presumably due to the strong binding between the component atoms. Both NiAl and FeAl grow on glass substrates with a (211) texture which makes the magnetic layer c-axis to be in-plane with a (1010) texture. Grain sizes on the order of 12 nm can be achieved even for thick layers greater than 60 nm. The use of both NiAl and Cr on NiP has also been proposed in a U.S. Pat. No. 6,010,795 to Chen et al. In this case, NiAl develops a (001) texture due to the (002) texture of the crystalline Cr pre-underlayer and the magnetic layer texture is Co(11$\bar{2}$0).

There are other seed layers aside from NiP that promote a Cr(002) texture. A U.S. Pat. No. 5,685,958 to Futamoto et al. propose refractory metals such as Ta, Cr, Nb, W and Mo with a reactive element consisting of at least 1% nitrogen or oxygen. In the case of Ta, which is reactively sputtered with Ar+$N_2$ gas, as the $N_2$ volume fraction is increased, Cr(002) appears in the XRD spectrum as well as Co(11$\bar{2}$0). A typical underlayer thickness of 50 nm was mentioned and wide variations in the thickness were claimed to only slightly affect the media magnetic characteristics. But as the volume fraction is increased to 3.3%, both peaks disappear, indicating the degradation of crystallographic orientation. Futamoto et al. propose a useful range of substrate temperatures Ts of 150° C. to 330° C. and a more preferred range of 210° C. to 250° C. This would make the substrate temperature Ts necessary for the deposition of the Cr onto TaN similar to that onto NiP. A useful range of nitrogen partial pressure of 0.1 mTorr to 2 mTorr was also suggested. The nitrogen concentration of the Ta—N films are unknown but may be between 10 at. % to 50 at. %.

Kataoka et al., "Magnetic and recording characteristics of Cr, Ta, W and Zr pre-coated glass disks", IEEE Trans. Magn., vol. 31, pp. 2734-2736, 1995 have earlier reported Cr, Ta, W, and Zr pre-coating layers on glass. For Ta films, reactive sputtering with the proper amount of $N_2$ actually improves the succeeding Cr underlayer crystallographic orientation. Cr directly deposited on glass develop not only the preferred (002) orientation but also an undesirable (110) texture.

Oh et al., "A Study on VMn underlayer in CoCrPt Longitudinal Media", IEEE Trans. Magn., vol. 37, pp. 1504-1507, 2001 reported a VMn alloy underlayer where the V content is 71.3 at. % and Mn content is 28.7 at. %. V has a high melting point of approximately 1500° C. and in principle may grow with small grains when sputtered but the texture is a very strong (110) on glass and on most seed layers.

A U.S. Pat. No. 5,344,706 to Lambeth et al. also proposed polycrystalline seed layers such as MgO which is B1 structured and a myriad of B2 structured materials such as NiAl and FeAl which function as templates for the succeeding Mn-containing alloys.

Good IPO leads to an increase in remanent magnetization and signal thermal stability. Goo IPO also improves the resolution or the capacity of the magnetic recording medium to support high-density bits. Recently developed synthetic ferrimagnetic media (SFM) provide improved thermal stability and resolution compared to conventional magnetic recording media of the same remanent magnetization and thickness product Mrt. The SFM is proposed in Abarra et al., "Longitudinal recording media with thermal stabilization layers", Appl. Phys. Lett., Vol. 77, pp. 2581-2583, October 2000. Seed layers that can be used for conventional magnetic recording media can also be used for the SFM, but the potential of the SFM for extending the limits of longitudinal recording can best be realized if the IPO is close to perfect.

The IPO can be quantified by low incident angle XRD such as that made by Doerner et al., "Demonstration of 35 Gbits/$in^2$ in media on glass substrates", IEEE Trans. Magn., vol. 37, pp. 1052-1058, March 2001 or, more simply, by taking the ratio of the coercivity normal to and along the film plane (h=Hc⊥/Hc, where Hc⊥ denotes perpendicular coercivity, and Hc denotes coercivity along the film plane).

The ratio h for the magnetic recording media on Cr(002)/NiP is typically h≦0.15, and h>0.2 is observed only for badly lattice matched underlayers and magnetic layers. For h≦0.15, the M(H) hysteresis loop perpendicular to the film normal is approximately linear with field and Hc⊥ is typically less than 500 Oe. In the case of NiAl, the (211) texture is weak and thicknesses greater than 50 nm are usually needed to realize the above and reduce the occurrence of magnetic grains with a (0002) orientation. Previous work on using NiAl directly on glass as a seed layer for conventional magnetic recording media resulted in poor squareness (h>0.25) and could not match the performance of magnetic recording media on Cr(002)/NiP. This is the case even when seed layers such as NiP and CoCrZr are employed.

XRD measurements by Doerner et al. showed that the magnetic c-axes are spread over an angle greater than ±20° compared to less than ±5° for magnetic recording media on NiP/Al—Mg substrates. For magnetic recording media on TaN, though the Cr(002) and Co(11$\bar{2}$0) peaks are visible from the XRD data, h>0.2 and the magnetic recording media underperform magnetic recording media on Cr(002)/NiP. The Cr alloy underlayer thickness used here is less than 10 nm, and the reduction of the ratio h was not observed by further increases in the underlayer thickness to greater than 20 nm.

Aside from the IPO, another concern in the manufacturing of the SFM is the increase in the number of chambers necessary compared to conventional magnetic recording media especially when bare glass substrates are used. Moreover, as throughput has to be maintained at a high level, the thickness of the deposited film is limited typically to 30 nm. Seed layers or underlayers that need to be thicker will require two chambers. The typical sequential deposition must also be made in a rapid fashion not only to have a high yield but also to prevent the temperature of the high emissivity glass substrate to drop before the magnetic layers are deposited. Else, a heating step is needed which will require a separate process chamber. The substrate emissivity is decreased by the seed layer and the underlayer such that both cannot be very thin. If a bias voltage is to be applied as in CVD C deposition, the total magnetic recording medium thickness needed is usually greater than 30 nm.

Recently, there have been studies on B2 structured AlRu seed layers on glass, and AlRu was found to be an excellent material in use with glass substrates for substantial improvement of the IPO over NiP coated glass substrates or NiAl coated glass substrates. However the useful range of AlRu where this is applicable is where the Ru content is 50% and AlRu has the B2 structure. Since the Ru content is large, the cost of the target is very high. In the current magnetic recording media, double AlRu layers are used with approximately 25 nm each to get the good IPO and signal-to-noise ratio requirements.

SUMMARY OF THE INVENTION

Accordingly, it is a general object of the present invention to provide a novel and useful magnetic recording media and magnetic storage apparatuses, in which the problems described above are eliminated.

Another and more specific object of the present invention is to provide a magnetic recording medium and a magnetic storage apparatus, which can reduce grain sizes of a magnetic recording layer, promote desired orientation of the magnetic recording layer, and realize an improved performance, at a relatively low cost.

Still another object of the present invention is to provide a magnetic recording medium comprising a seed layer made of one of AlRu and AlV, a magnetic recording layer made of a CoCr alloy, and an underlayer made of the other of AlRu and AlV, where the underlayer is disposed between the seed layer and the magnetic recording layer. According to the magnetic recording medium of the present invention, it is possible to reduce grain sizes of a magnetic recording layer, promote desired orientation of the magnetic recording layer, and realize an improved performance, at a relatively low cost.

A further object of the present invention is to provide a magnetic storage apparatus comprising at least one magnetic recording medium comprising a seed layer made of one of AlRu and AlV, a magnetic recording layer made of a CoCr alloy, and an underlayer made of the other of AlRu and AlV and disposed between the seed layer and the magnetic recording layer; and a head which writes information on and/or reproduces information from the magnetic recording medium. According to the magnetic storage apparatus of the present invention, it is possible to reduce grain sizes of a magnetic recording layer, promote desired orientation of the magnetic recording layer, and realize an improved performance, at a relatively low cost.

Other objects and further features of the present invention will be apparent from the following detailed description when read in conjunction with the accompanying drawings.

BRIEF DESCRIPTION OF THE DRAWINGS

FIG. 6 is a cross sectional view showing an important part of a third embodiment of the magnetic recording medium according to the present invention;

DESCRIPTION OF THE PREFERRED EMBODIMENTS

Figure 1:
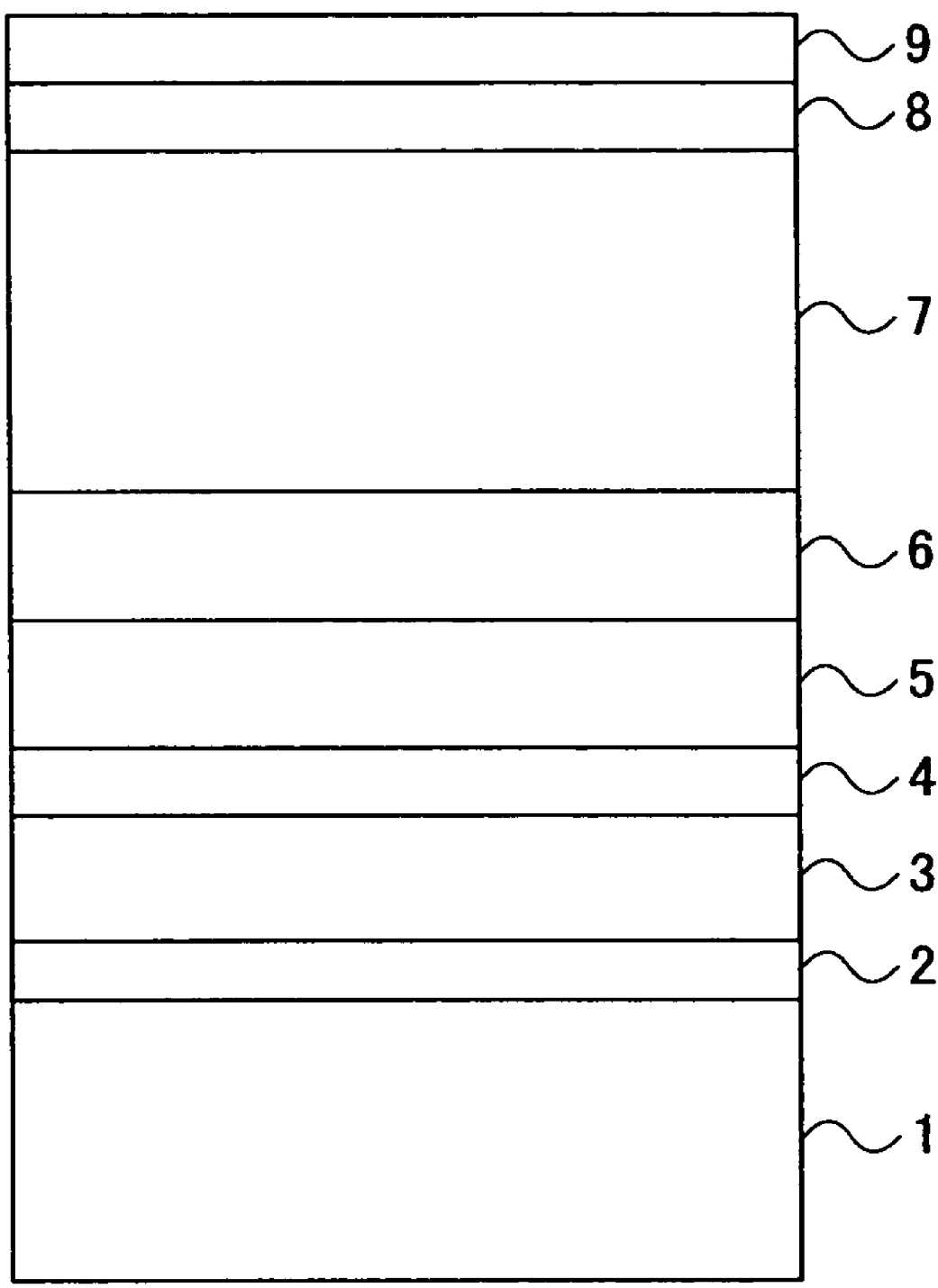
FIG. 1 is a cross sectional view showing a part of a first example of a conventional magnetic recording medium.
Figure 2:
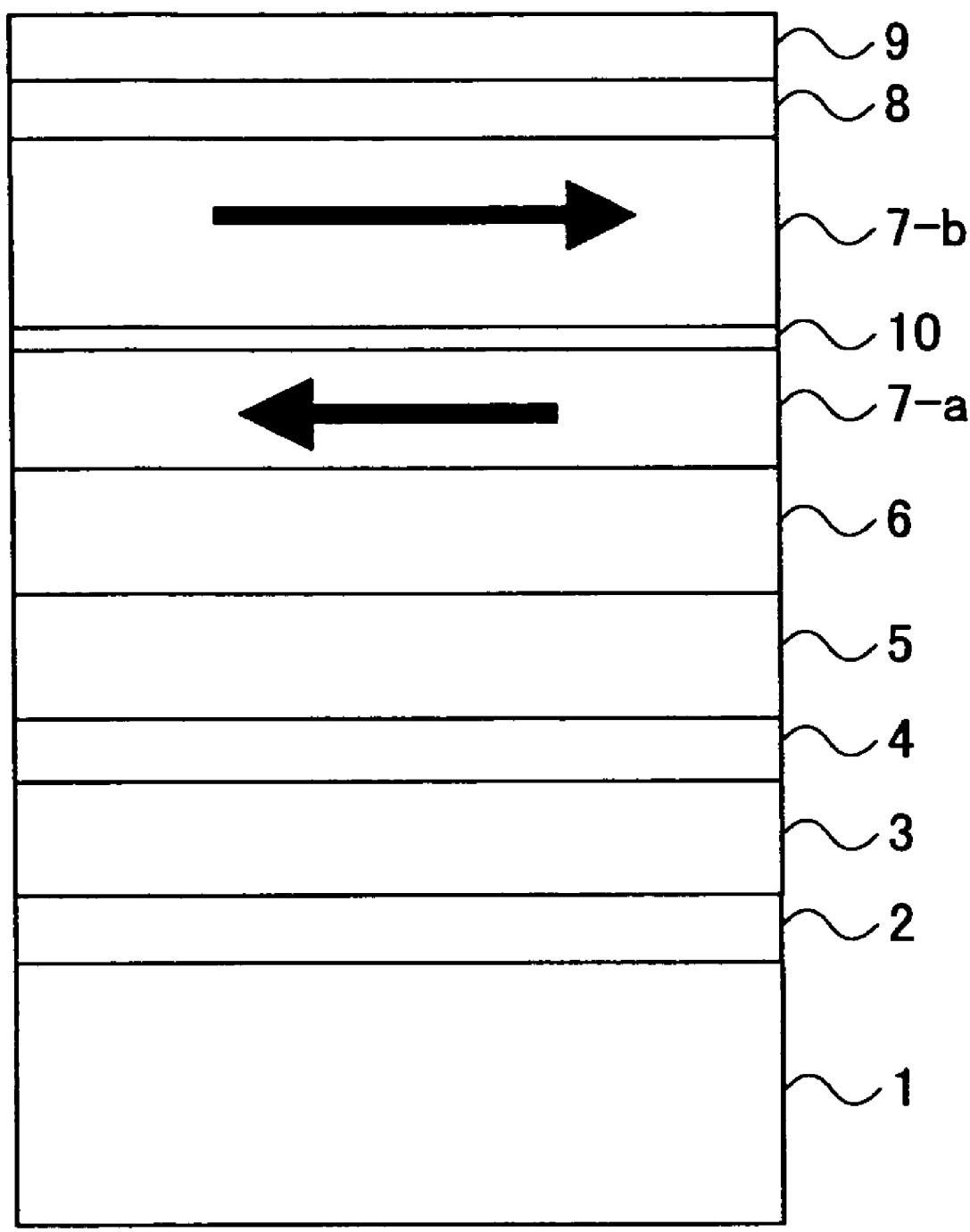
FIG. 2 is a cross sectional view showing a part of a second example of the conventional magnetic recording medium.
Figure 3:
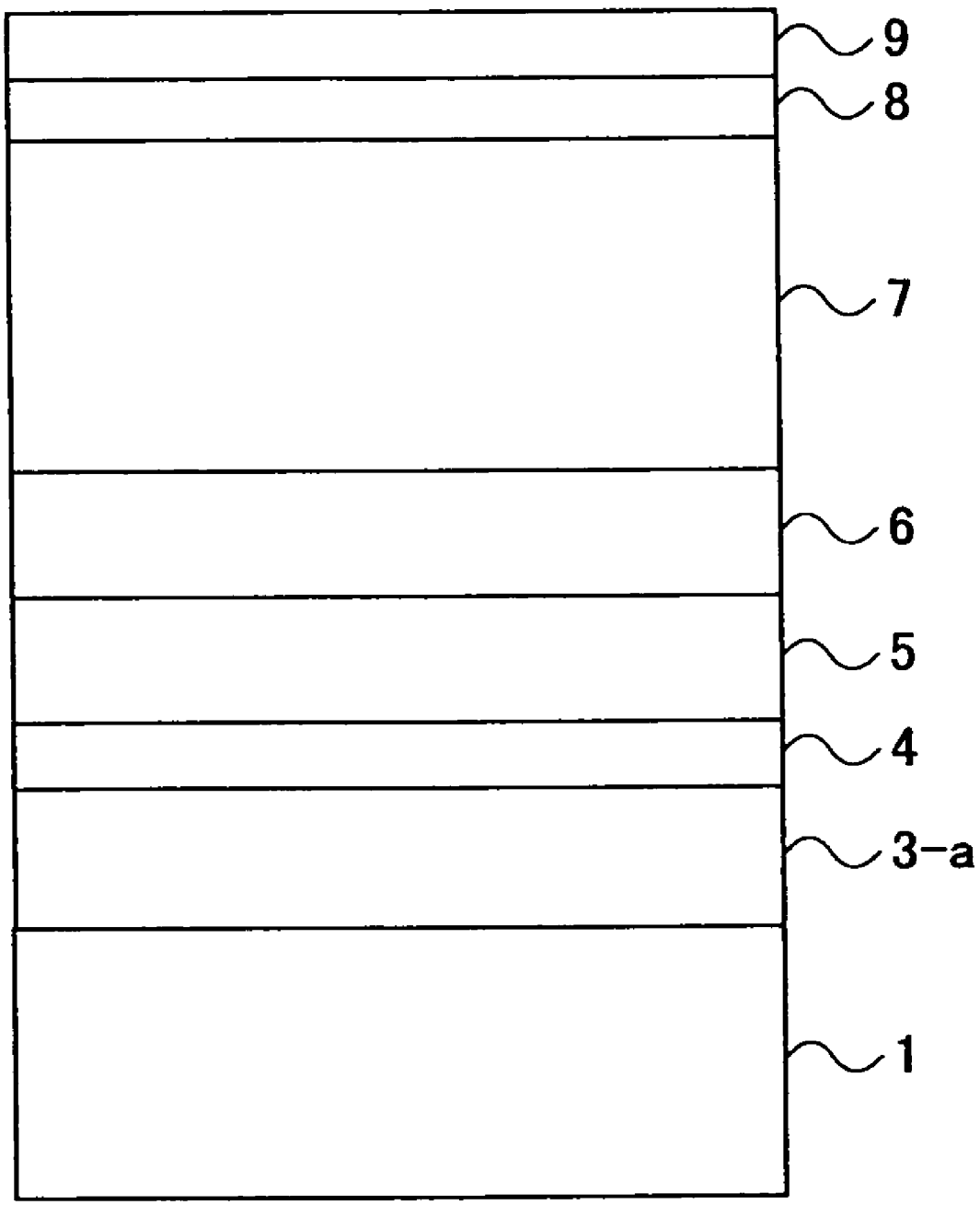
FIG. 3 is a cross sectional view showing a part of a third example of the conventional magnetic recording medium.
Figure 4:
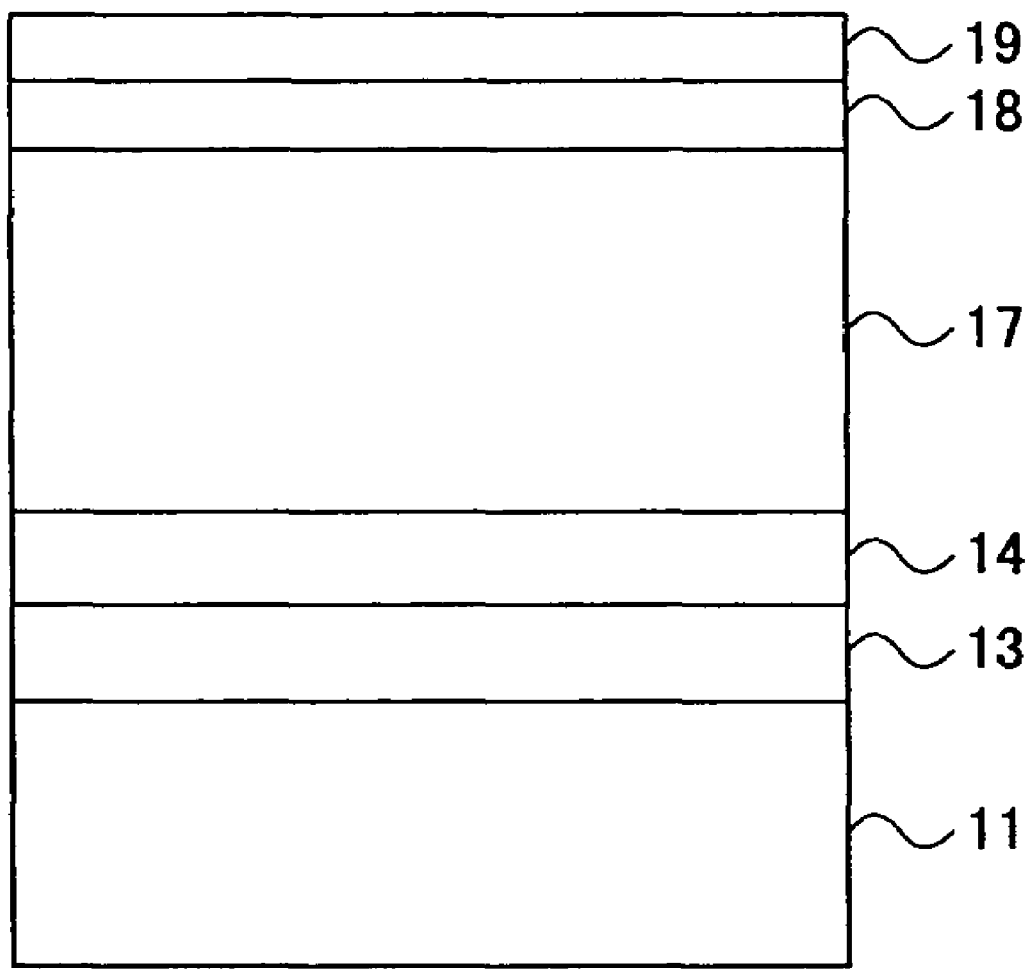
FIG. 4 is a cross sectional view showing an important part of a first embodiment of a magnetic recording medium according to the present invention.

FIG. 4 is a cross sectional view showing an important part of a first embodiment of a magnetic recording medium according to the present invention. In FIG. 4, on a glass or Al substrate 11 is deposited a seed layer 13 and an underlayer 14 which are made of intermetallic alloys. The seed layer 13 may be reactively sputtered with $N_2$ in an Ar+$N_2$ gas mixture or $O_2$ in an Ar+$O_2$ gas mixture at a suitable partial pressure, for example. On the underlayer 14 is deposited a magnetic recording layer (hereinafter simply referred to as a magnetic layer) 17 made of a Co alloy or a CoCr alloy. The magnetic layer 17 has a (11$\bar{2}$0) crystallographic orientation, and may be made up of a single layer or multiple layers that are in direct contact and behave magnetically as one magnetic layer. On the magnetic layer 17, a protective layer 18 made of C, and an organic lubricant layer 19 are deposited for use with a magnetic transducer such as a spin-valve head.

The glass or Al substrate 11 may be mechanically textured.

The intermetallic alloy used for the underlayer 14 may be a binary alloy such as AlV and AlRu, preferably B2 structured. The intermetallic alloy used for the underlayer 14 promotes lattice matching and crystallographic orientation of subsequent layers, and is useful for obtaining a good lattice matching with the (002) growth of Cr and subsequent (11$\bar{2}$0) texture of magnetic layers.

The AlV or AlRu underlayer material forming B2 structure may be deposited by sputtering from two separate metal targets or from separate metal targets whose compositions are predominantly formed from one type of material of the binary alloy. The underlayer 14 is deposited to a thickness of approximately 2 nm to 50 nm, and desirable approximately 10 nm to 40 nm, for example.

The seed layer 13, which functions as a buffer layer, is deposited prior to the underlayer 14, and is made of an amorphous or crystalline binary alloy such as AlRu and AlV which is other than the material used for the underlayer 14. For example, an AlRu seed layer 13 is used for an AlV underlayer 14, and an AlV seed layer 13 is used for an AlRu underlayer 14. The seed layer 13 promotes an excellent crystallographic orientation for the underlayer 14 and provides excellent (002) growth for Cr based subsequent layers and very good (11$\bar{2}$0) texture for the magnetic layer 17.

The seed layer 13 is deposited to a thickness of approximately 5 nm to 50 nm, and desirably approximately 10 nm to 40 nm, for example. Desirably, a total thickness of the seed layer 13 and the underlayer 14 is approximately 20 nm to 70 nm. This desired range of the total thickness can be deposited in just two chambers and reduces the drop in glass substrate temperature during deposition of subsequent layers. The seed layer 13 may be processed under a suitable temperature range at a suitable pressure, with or without the substrate bias. The substrate bias may be applied to a metallic substrate made of a material such as Al, however, a pre-seed layer made of a material such as Cr is desired for biasing when using a glass substrate.

When using AlV for the seed layer 13 or the underlayer 14, it is desirable that the V content x of AlVx is in a range of x=30 at. % to 80 at %.

The protective layer 18 is made of C having a thickness of approximately 1 nm to 5 nm, for example. In addition, the organic lubricant layer 19 has a thickness of approximately 1 nm to 3 nm. The C protective layer 18 may be deposited by CVD is hard, and protects the magnetic recording medium not only from atmospheric degradation but also from physical contacts with the head. The lubricant layer 19 reduces stiction between the head and the magnetic recording medium.

Figure 5:
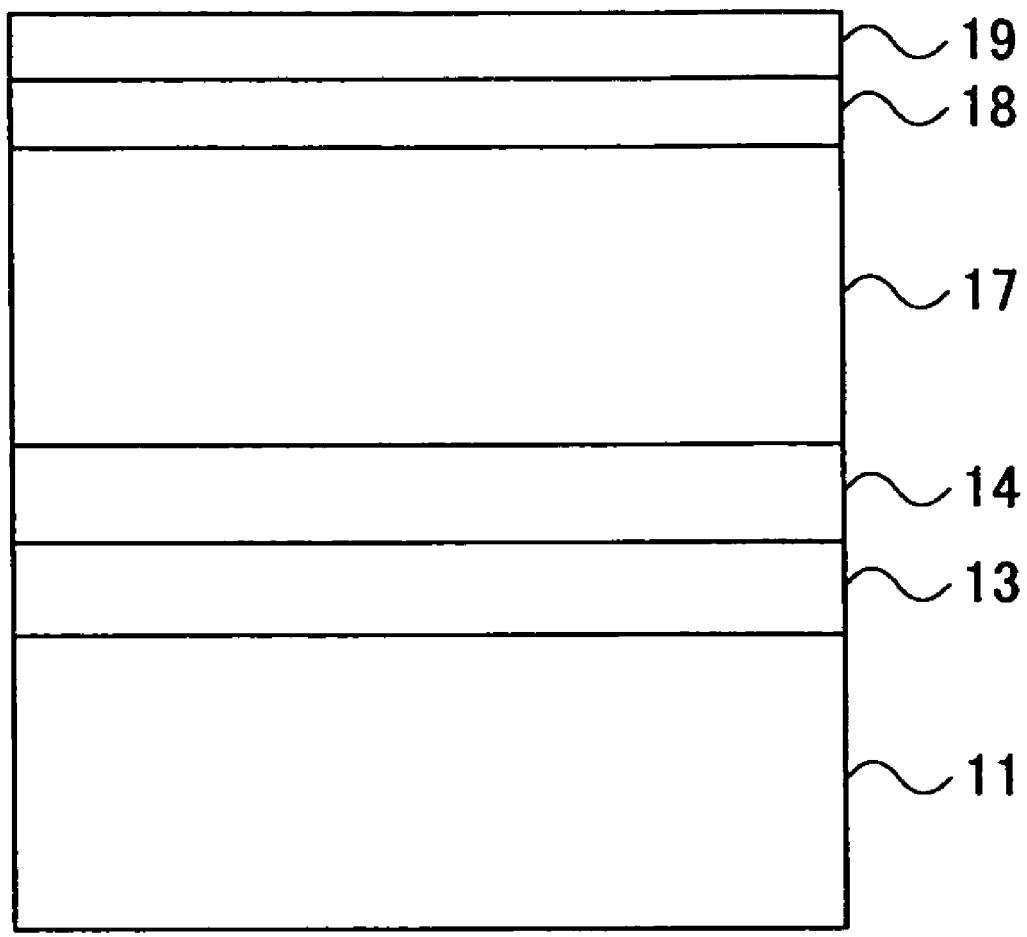
FIG. 5 is a cross sectional view showing an important part of a second embodiment of the magnetic recording medium according to the present invention.
Figure 7A:
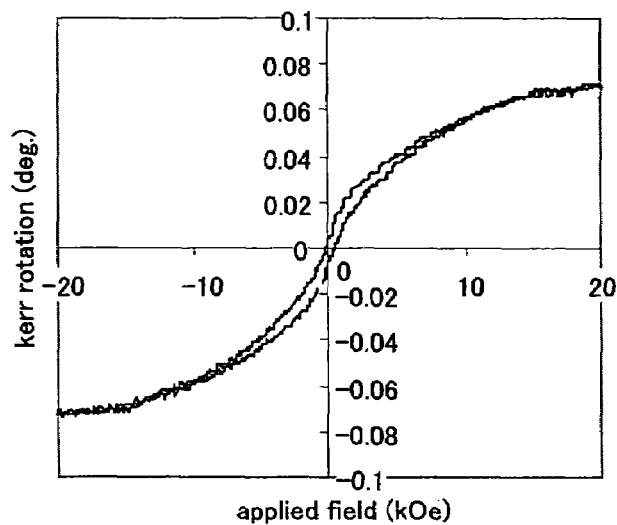
FIGS. 7A through 7C are diagrams showing an AlRu seed layer thickness dependence of perpendicular M-H loops for a first modification of the second embodiment, where the thickness of an AlV underlayer is fixed.
Figure 7B:
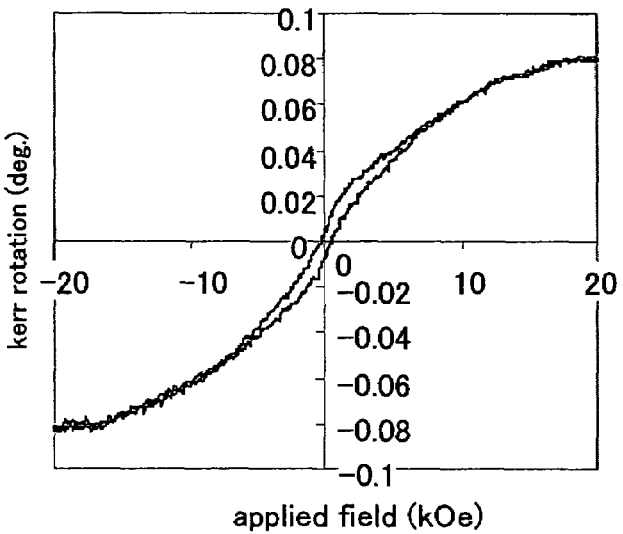
Figure 7C:
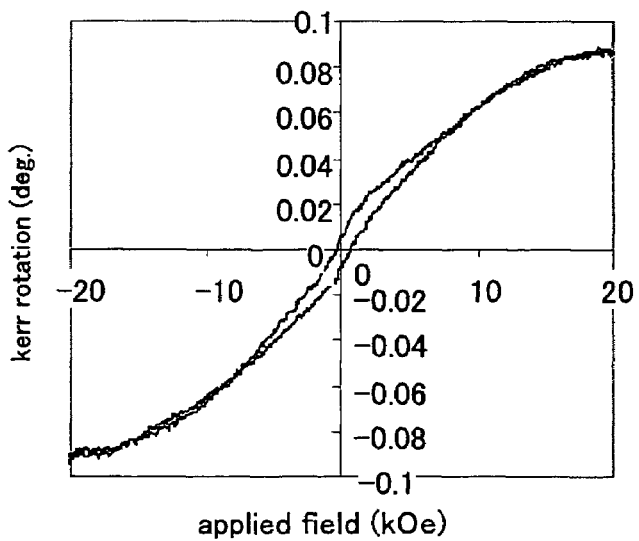
Figure 8A:
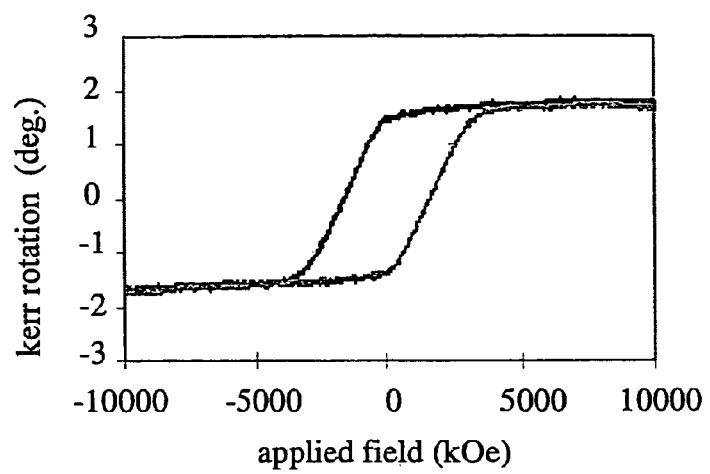
FIGS. 8A through 8C are diagrams showing an AlRu seed layer thickness dependence of in-plane M-H loops for the first modification of the second embodiment, where the thickness of an AlV underlayer is fixed.
Figure 8B:
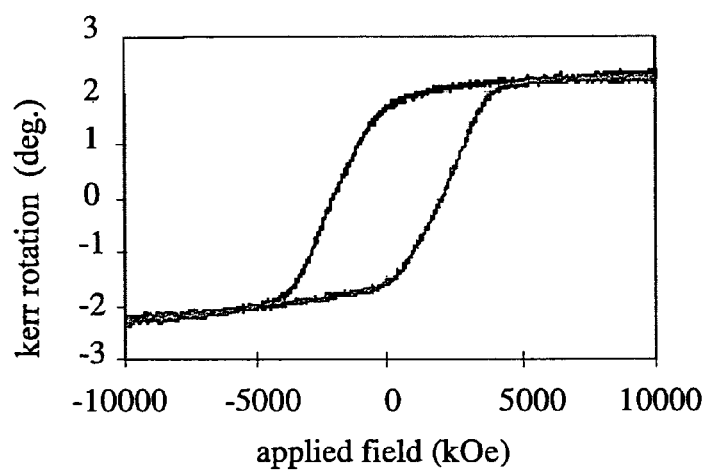
Figure 8C:
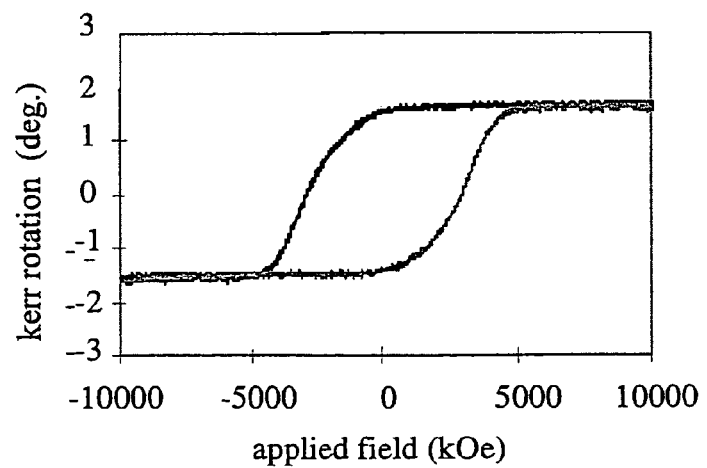
Figure 9A:
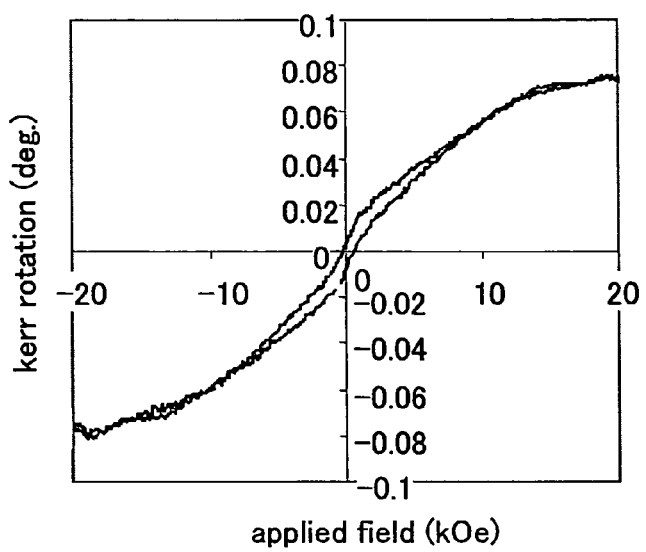
FIGS. 9A through 9C are diagrams showing an AlV underlayer thickness dependence of perpendicular M-H loops for the first modification of the second embodiment, where the thickness of the AlRu seed layer is fixed.
Figure 9B:
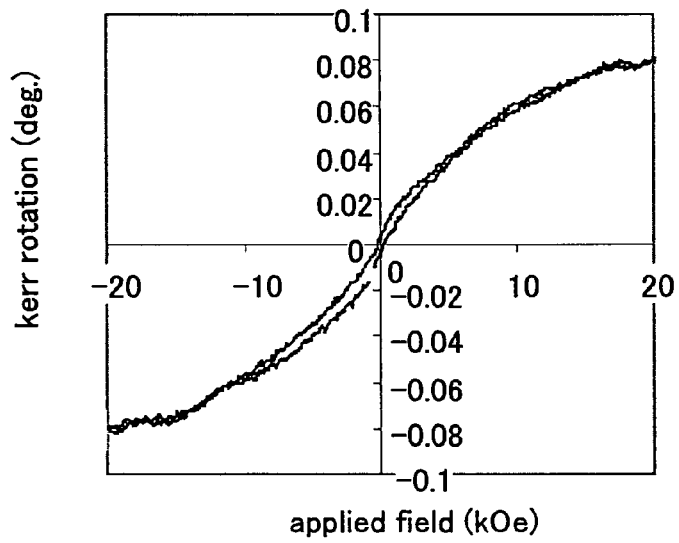
Figure 9C:
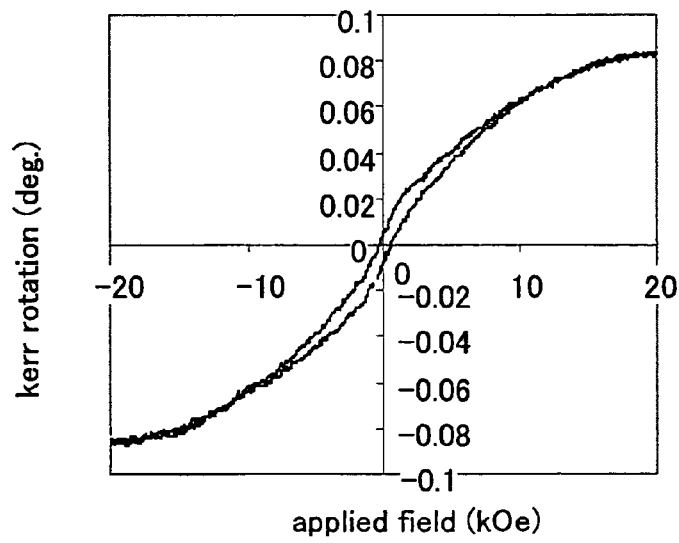
Figure 10A:
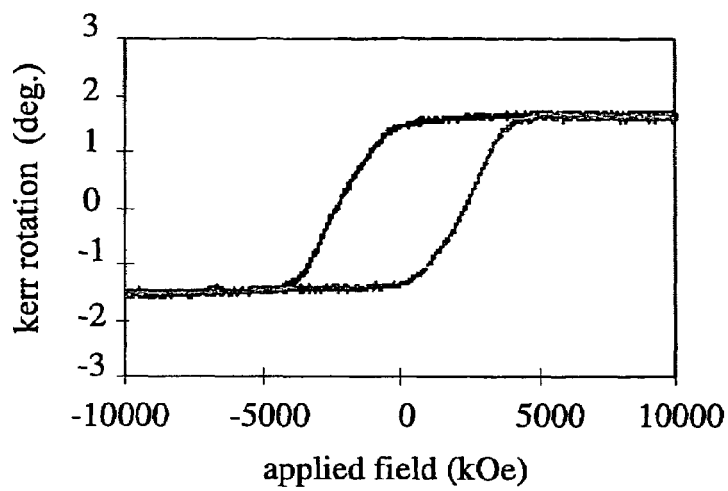
FIGS. 10A through 10C are diagrams showing an AlV underlayer thickness dependence of in-plane M-H loops for the first modification of the second embodiment, where the thickness of the AlRu seed layer is fixed.
Figure 10B:
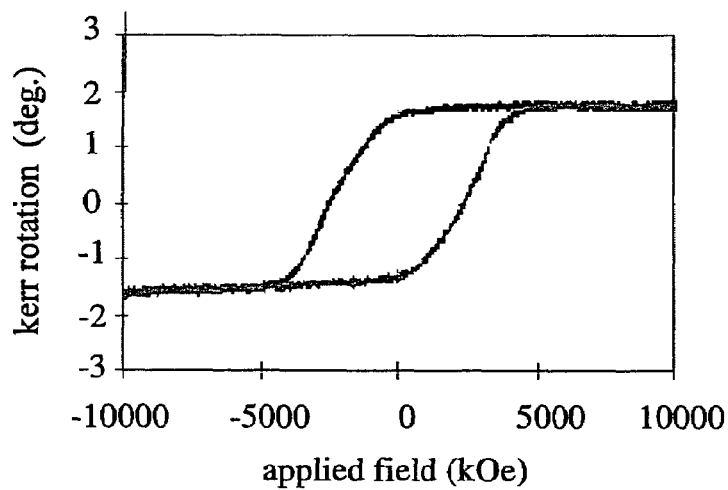
Figure 10C:
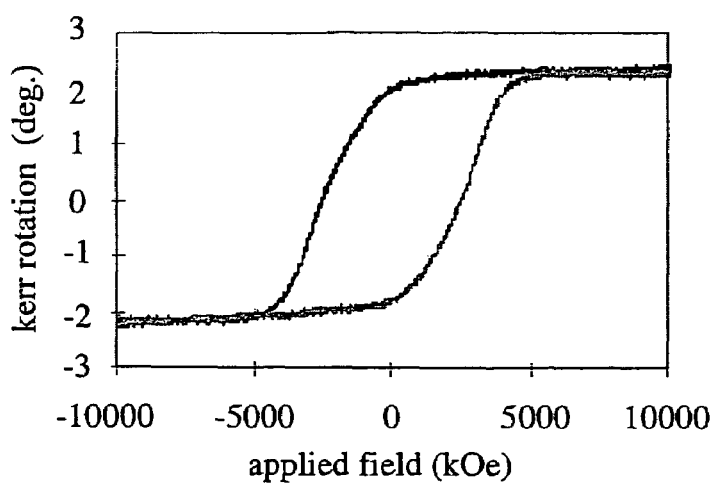

FIG. 5 is a cross sectional view showing an important part of a second embodiment of the magnetic recording medium according to the present invention. In FIG. 5, those parts which are the same as those corresponding parts in FIG. 4 are designated by the same reference numerals, and a description thereof will be omitted.

In FIG. 5, a seed layer 13 is reactively sputtered with $N_2$ in an Ar+$N_2$ gas mixture or with $O_2$ in an Ar+$O_2$ gas mixture, with a $N_2$ or $O_2$ partial pressure $P_{N,O}$=1% to 20%. The metal nitride or oxide seed layer 13 promotes an excellent crystallographic orientation for the underlayer 14 and provides excellent (002) growth for Cr based subsequent layers and very good (11$\bar{2}$0) texture for the magnetic layer 17. Hence, this seed layer 13 improves the IPO significantly from the first embodiment described above.

FIG. 6 is a cross sectional view showing an important part of a third embodiment of the magnetic recording medium according to the present invention. In FIG. 6, those parts which are the same as those corresponding parts in FIG. 4 are designated by the same reference numerals, and a description thereof will be omitted.

In FIG. 6, a plurality of magnetic layers 17-a and 17-b that are antiferromagnetically coupled through a Ru spacer layer 20 to form the so-called synthetic ferrimagnetic medium (SFM) structure. Furthermore, a lattice matching layer 15 may be disposed between the magnetic layer structure (17-a, 17-b) and the underlayer 14 for lattice matching with the magnetic layer structure (17-a, 17-b) and prevention of diffusion from the underlayer 14 into the magnetic layer structure (17-a, 17-b). An hcp interlayer 16 may be inserted between the magnetic layer structure (17-a, 17-b) and the underlayer 14. The hcp interlayer 16 also serves as a buffer between the bcc underlayer 14 and the hcp magnetic layer structure (17-a, 17-b).

The lattice matching layer 15 may be made of Cr-M layer and deposited to a thickness of approximately 1 nm to 10 nm, where M is a material selected from a group consisting of Mo, Ti, V, and W with an atomic proportion greater than or equal to 5%. Cr-rich alloys adhere well to many types of materials such that it makes a good buffer layer between the underlayer 14 and the magnetic layer 17. The provision of the lattice matching layer 15 made of the Cr-rich alloy prevents the diffusion of too much V into the magnetic layer 17. Since the Cr lattice parameter (a=0.2886 nm) is smaller than the AlV underlayer lattice parameter (a$\geq$0.29 nm), it is advantageous to alloy Cr with a larger element such as those listed. Also, alloying helps the Cr lattice to expand a little so that lattice matching with the magnetic layer 17 is maintained well.

Alternatively, the lattice matching layer 15 may be made essentially of Ru having a thickness of approximately 1 nm to 3 nm. However, since the lattice parameters of the Ru lattice matching layer 15 are larger than those of the Co alloy or CoCr alloy used for the magnetic layers 17-a and 17-b, the Ru lattice matching layer 15 cannot be too thick.

The hcp interlayer 16 is made of a slightly magnetic or nonmagnetic hcp structured CoCr alloy which is deposited to a thickness of approximately 1 nm to 5 nm. The hcp structured CoCr alloy includes CoCrPtB, CoCrPt, CoCrTa, CoCrPtTa, CoCrPtTaB and the like. When hcp magnetic CoCr alloys are grown directly on bcc Cr alloy films, a portion of the magnetic layer 17-a in contact with the bcc underlayer 14 is adversely affected due to lattice mismatch and/or diffusion of elements from seed layer 13, and in this case, the magnetic anisotropy of the magnetic layer 17-a is reduced as well as the total magnetization of the magnetic layer structure (17-a, 17-b). The use of the hcp nonmagnetic interlayer 16 prevents such undesirable effects from occurring on the magnetic layer structure (17-a, 17-b). As a result, the magnetic anisotropy and the coercivity of the magnetic layer structure is increased. In addition, the in-plane orientation of the magnetic layer structure is improved as the interlayer 16 functions to gradually match the lattice parameters, and the full magnetization of the magnetic layer structure is obtained, that is, the so-called "dead layer" is minimized. Moreover, the formation of smaller grains at the interface of the magnetic layer structure is also minimized.

The SFM structure may be made up of at least two antiferromagnetically coupled CoCr alloy magnetic layers, wherein c-axes of the magnetic layers are significantly parallel to the film plane thereof such that a ratio h<0.15 stands, where h=Hc$\perp$/Hc, Hc$\perp$ denotes perpendicular coercivity, and Hc denotes coercivity along the film plane. The SFM has an improved thermal stability but require excellent in-plane orientation which is provided by the above described combination of the seed layer 13 and the underlayer 14.

Of course, the lattice matching layer 15 and/or the interlayer 16 may be used in the first and second embodiments shown in FIGS. 4 and 5 to obtain similar effects as when used in the third embodiment shown in FIG. 6.

Therefore, the embodiments described above provide a scheme for making a (001) texture from a seed layer and underlayer combination (structure) which is made using a relatively inexpensive alloy which may be a B2 structured alloy and/or a binary alloy. More particularly, the seed layer 13 develops a particular preferred crystallographic orientation which helps for the specific crystallographic orientation for the subsequently deposited underlayer 14 and magnetic layer 17. Furthermore, the underlayer 14 improves the preferred crystallographic orientation for the subsequent deposited intermediate layers (15, 16) and magnetic layer 17 (or 17-a and 17-b). Moreover, the grain sizes of the magnetic layer 17 (17-a and 17-b) can be controlled to achieve high-density recording, and the recording properties can be improved compared to the conventional magnetic recording media.

Next, a description will be given of a first modification of the second embodiment shown in FIG. 5 where the underlayer 14 is made of AlV and has a thickness of 5 nm to 30 nm, and the seed layer 13 is made of AlRu reactively sputtered with $N_2$ in an $Ar+N_2$ gas mixture or with $O_2$ in an $Ar+O_2$ gas mixture at a $N_2$ or $O_2$ partial pressure $P_{N,O}$=1% to 20% and has a thickness of 5 nm to 30 nm. This first modification of the second embodiment includes a lattice matching layer 15 similar to that shown in FIG. 6 between the underlayer 14 and the magnetic layer 17. It is assumed that the substrate 11 is made of glass, the lattice matching layer 15 is made of CrMo, and the magnetic layer 17 is made of CoCrPtBCu.

FIGS. 7A through 7C and FIGS. 8A through 8C respectively are diagrams showing the AlRu seed layer thickness dependence of perpendicular (out-of-plane) and in-plane M-H loops for this first modification of the second embodiment, where the thickness of the AlV underlayer 14 is 20 nm. In FIGS. 7A through 8C, the ordinate indicates the Kerr rotation (degrees), and the abscissa indicates the applied field (kOe). Further, in FIGS. 7A and 8A, 7B and 8B, and 7C and 8C, the thicknesses of the AlRu seed layer 13 respectively are 5 nm, 15 nm and 30 nm. The lattice matching layer 15 has a thickness of 20 nm, and the magnetic layer 17 has a thickness of 18 nm.

It was confirmed from FIGS. 7A through 8C that the IPO is maintained well for this first modification having the AlRu seed layer 13 having the thickness in the range of 5 nm to 30 nm. Hence, it was confirmed that the thickness of the AlRu seed layer 13 can be reduced. Comparing this first modification with an example of a magnetic recording medium having a glass substrate, a NiP seed layer, a Cr(002) underlayer, a CoCr intermediate layer and a magnetic layer, the AlRu seed layer 13 can be made thin and the IPO can be improved compared to this example of the magnetic recording medium having a more complex structure including the intermediate layer. As a result, this first modification gives a promising way to reduce the number of process or sputtering chambers and thus reduce the cost of the magnetic recording medium.

FIGS. 9A through 9C and FIGS. 10A through 10C respectively are diagrams showing the AlV underlayer thickness dependence of perpendicular (out-of-plane) and in-plane M-H loops for this first modification of the second embodiment, where the thickness of the AlRu seed layer 13 is 20 nm. In FIGS. 9A through 10C, the ordinate indicates the Kerr rotation (degrees), and the abscissa indicates the applied field (kOe). Further, in FIGS. 9A and 10A, 9B and 10B, and 9C and 10C, the thicknesses of the AlV underlayer 14 respectively are 5 nm, 15 nm and 30 nm. The lattice matching layer 15 has a thickness of 20 nm, and the magnetic layer 17 has a thickness of 18 nm.

It was confirmed from FIGS. 9A through 10C that a thinner AlV underlayer 14 shows better magnetic properties, and as the thickness of the AlV underlayer 14 increases, the perpendicular (out-of-plane) coercivity also increases to thereby degrade the performance of the magnetic recording medium eventually.

Figure 11:
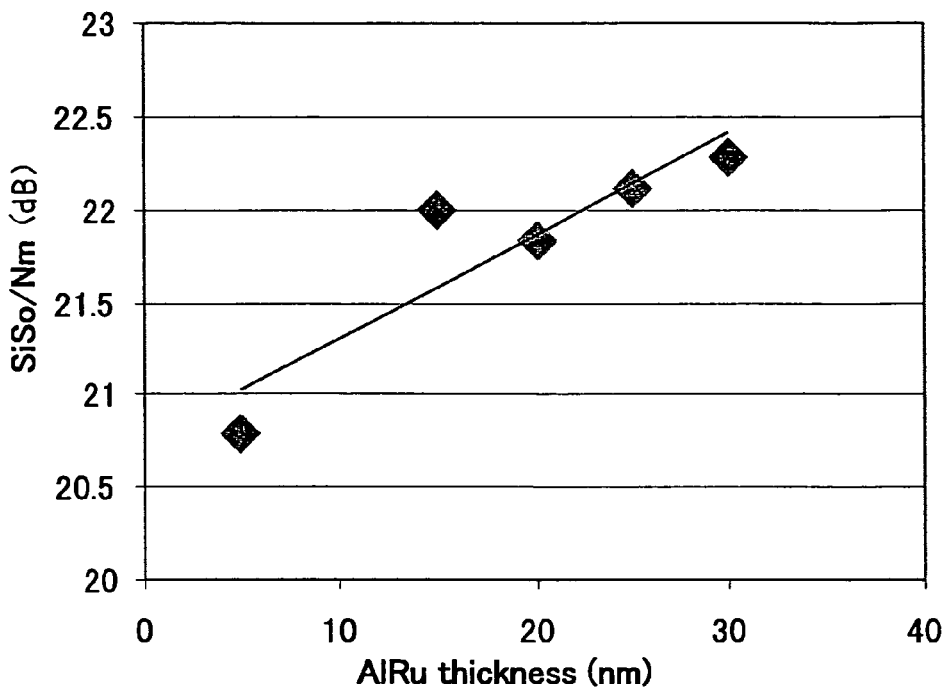
FIG. 11 is a diagram showing an isolated signal-to-noise ratio Siso/Nm variation with the AlRu seed layer thickness.
Figure 12:
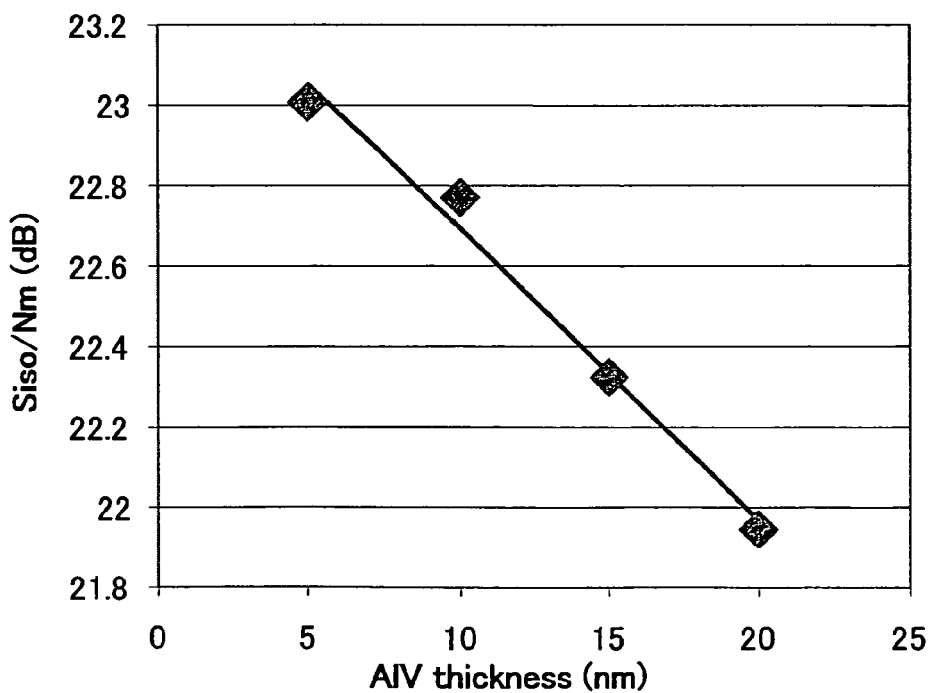
FIG. 12 is a diagram showing the isolated signal-to-noise ratio Siso/Nm variation with the AlV underlayer thickness.
Figure 13:
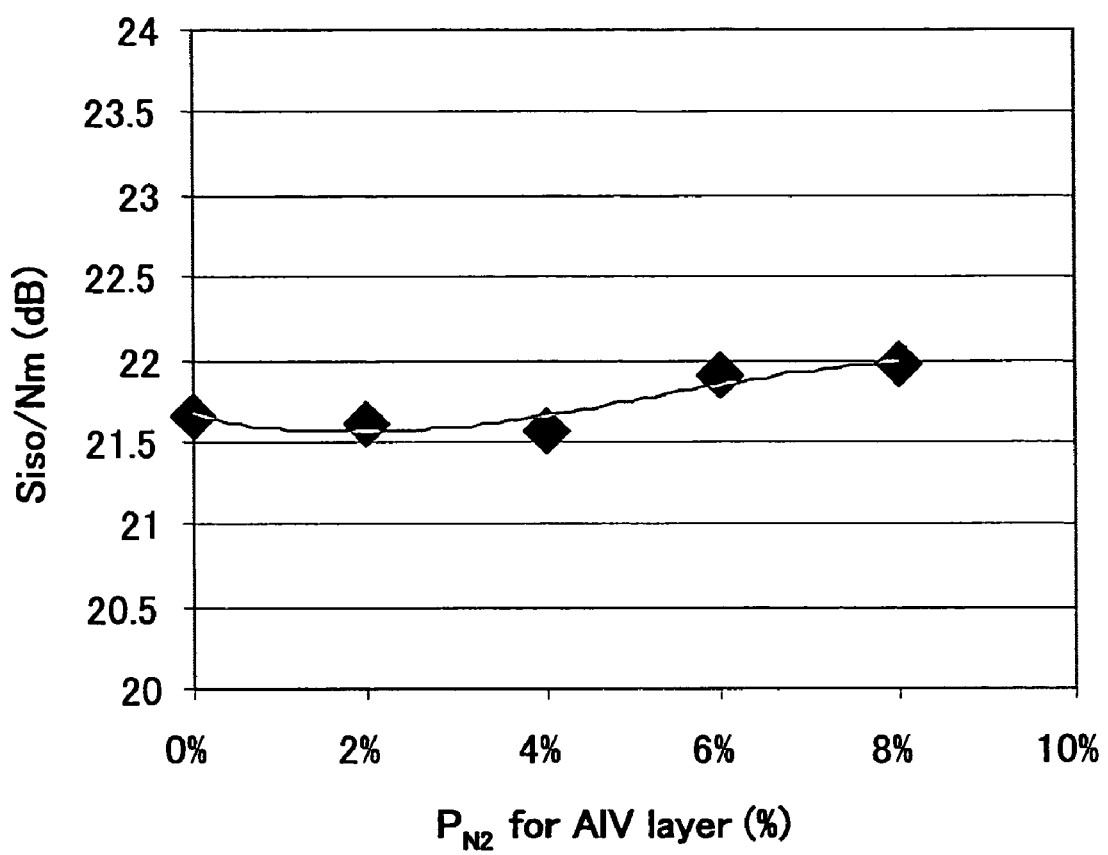
FIG. 13 is a diagram showing the isolated signal-to-noise ratio Siso/Nm variation when the AlV underlayer is reactively sputtered with various $N_2$%.
Figure 14A:
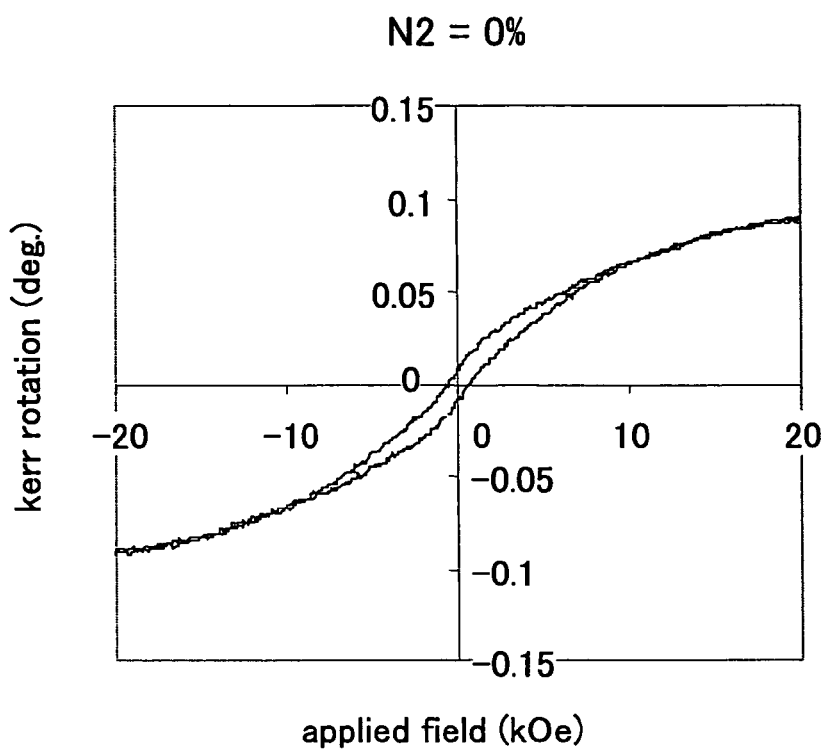
FIGS. 14A through 14D are diagrams showing the $N_2$ partial pressure dependence of perpendicular (out-of-plane) M-H loops for a second modification of the second embodiment when reactively sputtering the AlRu seed layer.
Figure 14B:
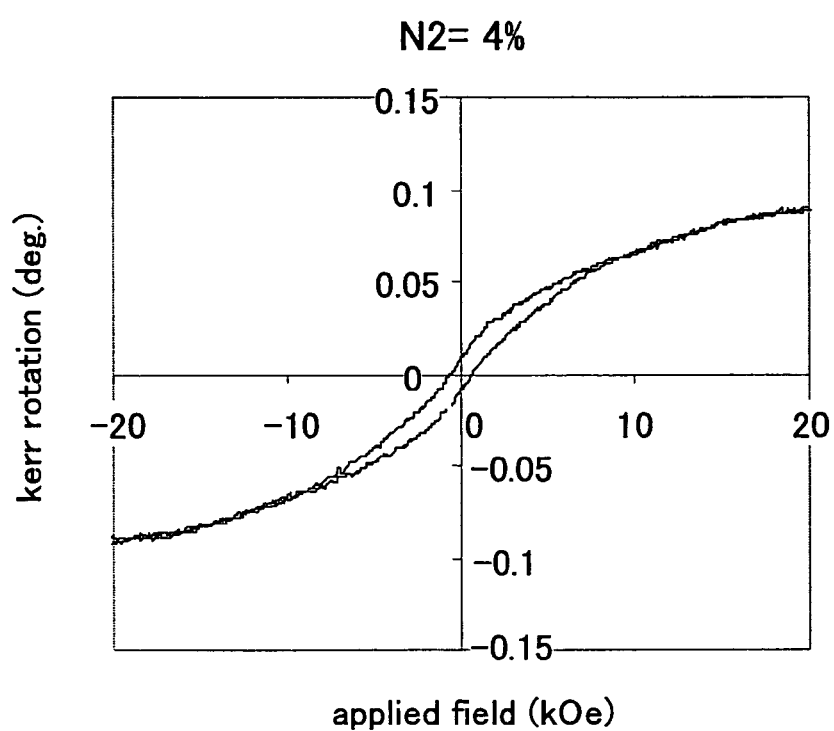
Figure 14C:
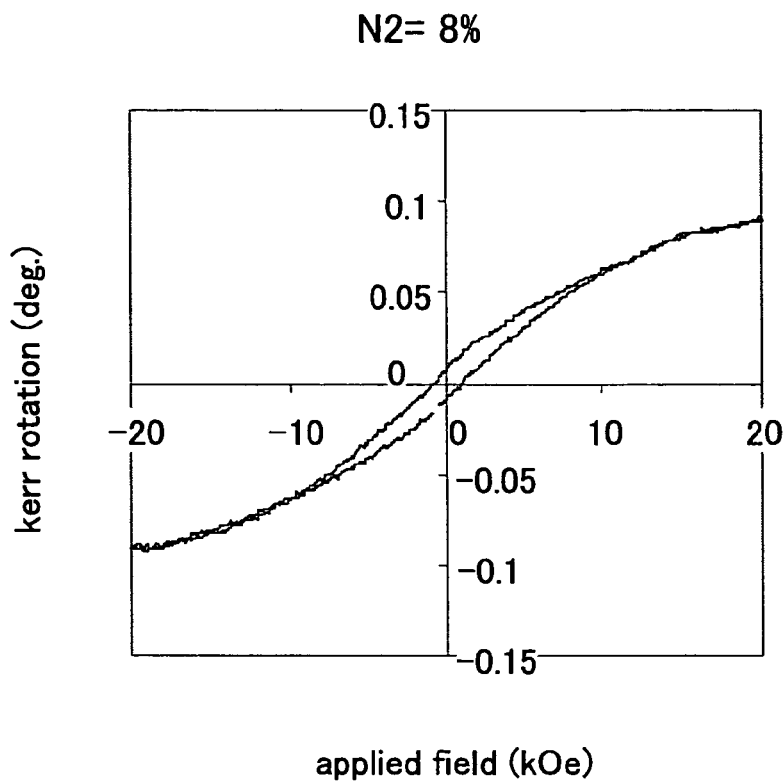
Figure 14D:
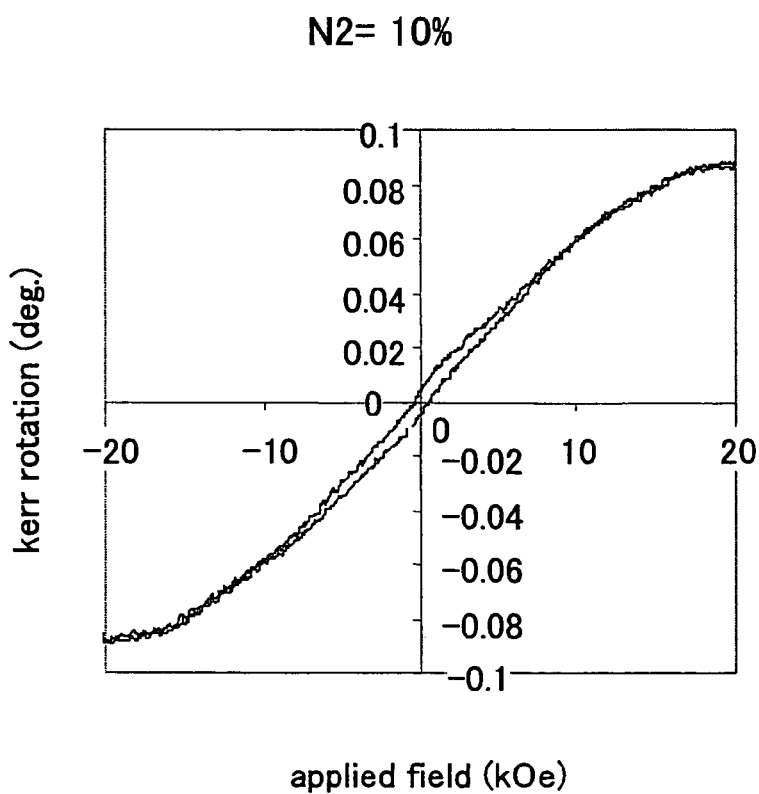
Figure 15A:
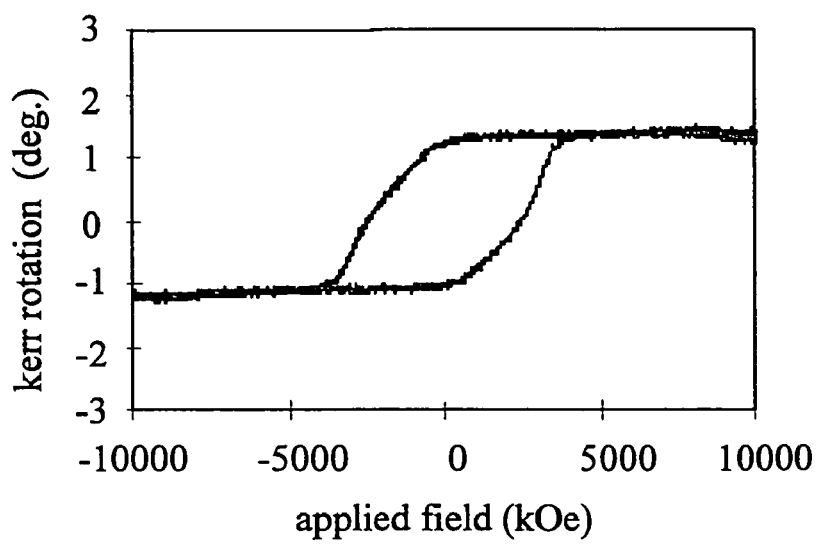
FIGS. 15A through 15D are diagrams showing the $N_2$ partial pressure dependence of in-plane M-H loops for the second modification of the second embodiment when reactively sputtering the AlRu seed layer.
Figure 15B:
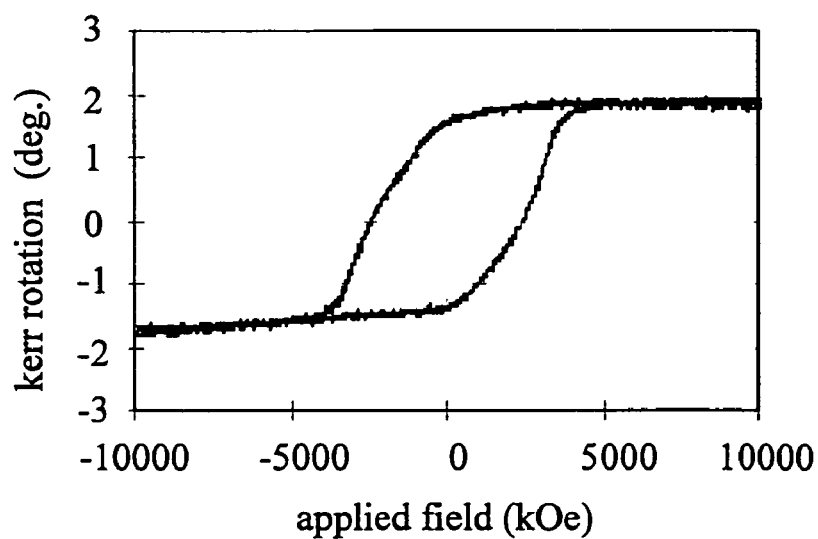
Figure 15C:
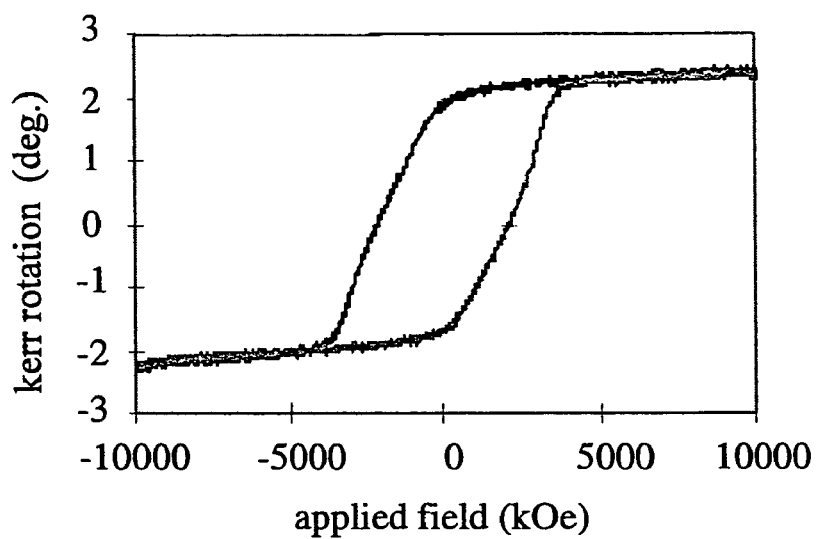
Figure 15D:
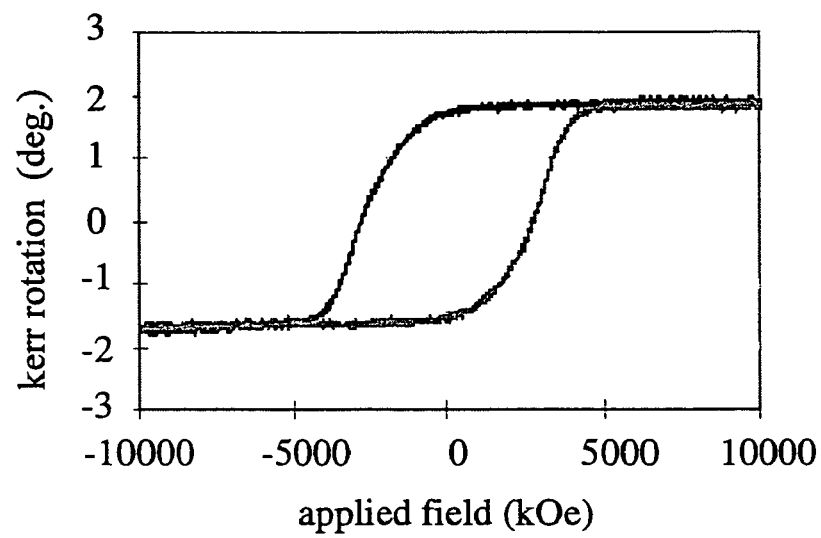

FIGS. 11 through 13 are diagrams for explaining an isolated signal-to-noise ratio Siso/Nm (dB) evaluated for the first modification of the second embodiment using a head measured at 662 kfci. FIG. 11 is a diagram showing the Siso/Nm variation with the AlRu seed layer thickness, FIG. 12 is a diagram showing the Siso/Nm variation with the AlV underlayer thickness, and FIG. 13 is a diagram showing the Siso/Nm variation when the AlV underlayer is reactively sputtered with various $N_2$%. In FIGS. 11 and 12, the ordinate indicates the Siso/Nm (dB), and the abscissa indicates the layer thickness (nm). In FIG. 13, the ordinate indicates the Siso/Nm (dB), and the abscissa indicates the partial $P_{N2}$ (%) of $N_2$ for the AlV layer.

It was confirmed from FIG. 11 that as the thickness of the AlRu seed layer 13 increases, the Siso/Nm value also increases. Nearly 1.5 dB difference is found when the thickness of the AlRu seed layer 13 is varied from 5 nm to 30 nm. However, if was confirmed from FIG. 12 that if the thickness of the AlV underlayer 14 is increased, the trend is reverse, indicating a thinner AlV underlayer 14 is preferable in this case. Further, it was confirmed from FIG. 13 that there is virtually no effect of the reactive sputtering of the AlV underlayer 14 with $N_2$ on the performance of the magnetic recording medium.

Next, a description will be given of a second modification of the second embodiment shown in FIG. 5, where the underlayer 14 is made of AlRu and has a thickness of 5 nm to 30 nm, and the seed layer 13 is made of AlV reactively sputtered with $N_2$ in an $Ar+N_2$ gas mixture at a $N_2$ partial pressure $P_N$=1% to 10% and has a thickness of 5 nm to 30 nm. This second modification of the second embodiment includes a lattice matching layer 15 similar to that shown in FIG. 6 between the underlayer 14 and the magnetic layer 17. It is assumed that the substrate 11 is made of glass, the lattice matching layer 15 is made of CrMo, and the magnetic layer 17 is made of CoCrPtBCu.

FIGS. 14A through 14D and FIGS. 15A through 15D respectively are diagrams showing the $N_2$ partial pressure dependence of perpendicular (out-of-plane) and in-plane M-H loops for this second modification of the second embodiment shown in FIG. 5 when reactively sputtering the AlRu seed layer. In FIGS. 14A through 15D, the ordinate indicates the Kerr rotation (degrees), and the abscissa indicates the applied field (kOe). Further, in FIGS. 14A and 15A, 14B and 15B, 14C and 15C, and 14D and 15D, the $N_2$ partial pressures $P_N$ respectively are 0%, 4%, 8% and 10%. The lattice matching layer 15 has a thickness of 20 nm, and the magnetic layer 17 has a thickness of 18 nm.

It was confirmed from FIGS. 14A through 15D that the IPO is maintained well for this second modification having the $N_2$ partial pressure $P_N$ in the range of 4% to 10%. Hence, it was confirmed that the IPO is best for the $N_2$ partial pressure $P_N$=10% for this particular case. Comparing this second modification with the above described example of the magnetic recording medium having the glass substrate, the NiP seed layer, the Cr(002) underlayer, the CoCr intermediate layer and the magnetic layer, the AlV seed layer 13 can be reactively sputtered with $N_2$ in an $Ar+N_2$ gas mixture at a suitable partial pressure $P_N$ to obtain the IPO which is improved compared to this example of the magnetic recording medium having a more complex structure including the intermediate layer. As a result, this second modification also gives a promising way to reduce the number of process or sputtering chambers and thus reduce the cost of the magnetic recording medium.

According to experiments conducted by the present inventor, it was found that the IPO is improved when the AlV seed layer 13 is reactively sputtered with $N_2$ in an Ar+$N_2$ gas mixture at a $N_2$ partial pressure $P_N$ in the range of 1% to 20%. Similarly, it was also found that the IPO can similarly be improved when the AlV seed layer 13 reactively sputtered with $O_2$ in an Ar+$O_2$ gas mixture at an $O_2$ partial pressure $P_O$ in the range of 1% to 20%.

Figure 16:
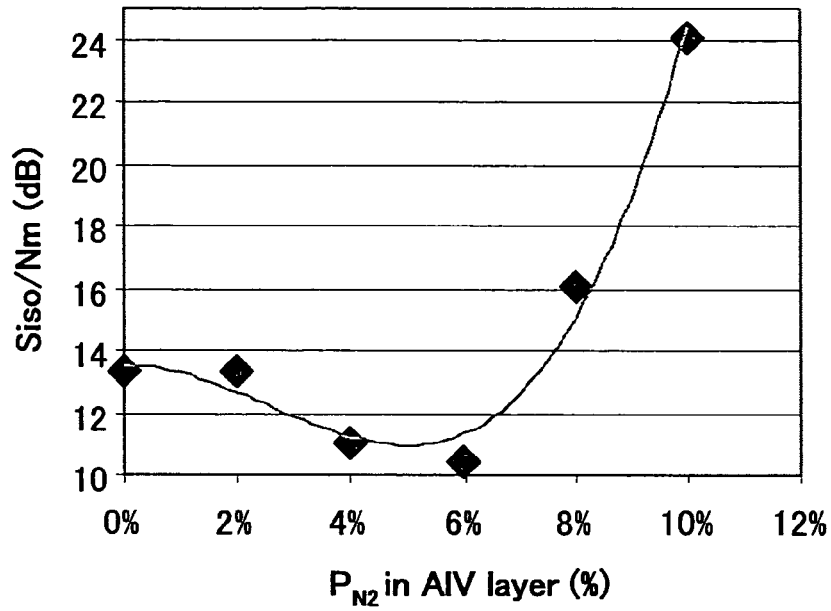
FIG. 16 is a diagram showing the Siso/Nm variation with the $N_2$ partial pressure PN used in reactively sputtering the AlV seed layer.

FIG. 16 is a diagram for explaining an isolated signal-to-noise ratio Siso/Nm (dB) for the second modification of the second embodiment using a head measured at 662 kfci. FIG. 16 shows the Siso/Nm variation with the $N_2$ partial pressure $P_N$ used in reactively sputtering the AlV seed layer 13. In FIG. 16, the ordinate indicates the Siso/Nm (dB), and the abscissa indicates the partial pressure $P_N$ (%) of $N_2$ when reactively sputtering the AlV seed layer. The perpendicular (out-of-plane) and in-plane M-H loops when the AlV seed layer 13 is reactively sputtered with $N_2$ partial pressure $P_N$=10% are respectively shown in FIGS. 14D and 15D described above.

As is very clear from FIG. 16, there is a large increase in the isolated signal-to-noise ratio Siso/Nm when the partial pressure $P_N$ of $N_2$ is high, and the isolated signal-to-noise ratio Siso/Nm is the highest when the partial pressure $P_N$=10%.

Figure 17:
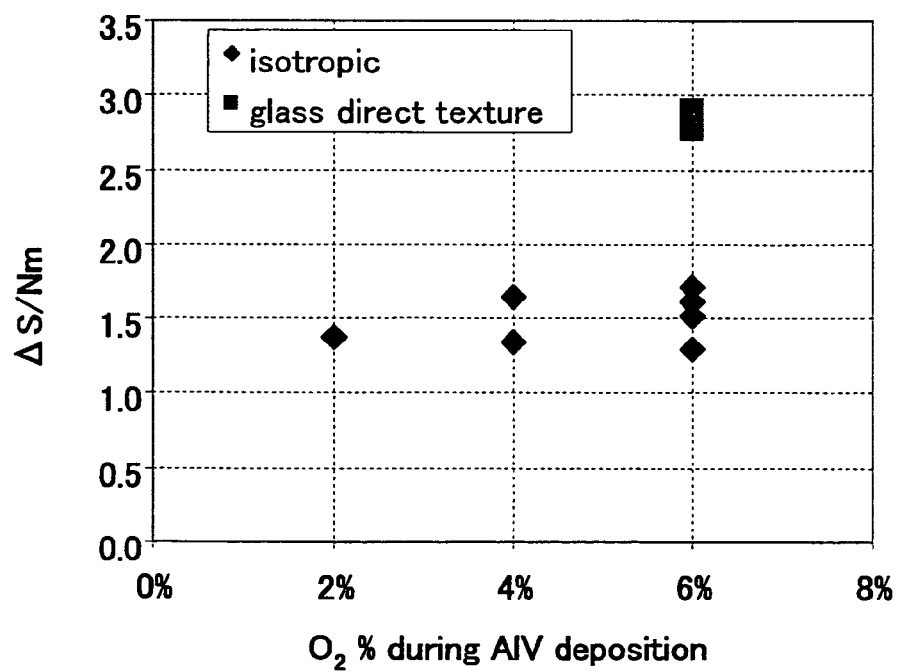
FIG. 17 is a diagram showing an isolated signal-to-medium noise ratio Siso/Nm comparison of the second modification of the second embodiment of the magnetic recording medium and a 35 Gbit/in$^2$ magnetic recording medium evaluated at F2=330 kfci recording density.
Figure 18A:
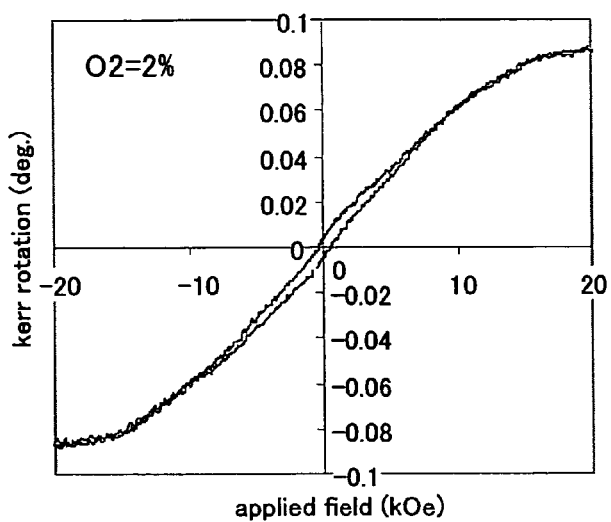
FIGS. 18A through 18C are diagrams showing the $O_2$ partial pressure dependence of perpendicular (out-of-plane) for a modification of the third embodiment when reactively sputtering the AlRu seed layer.
Figure 18B:
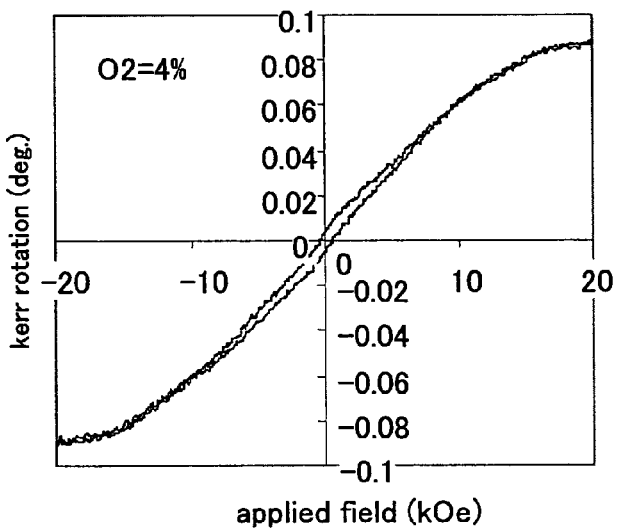
Figure 18C:
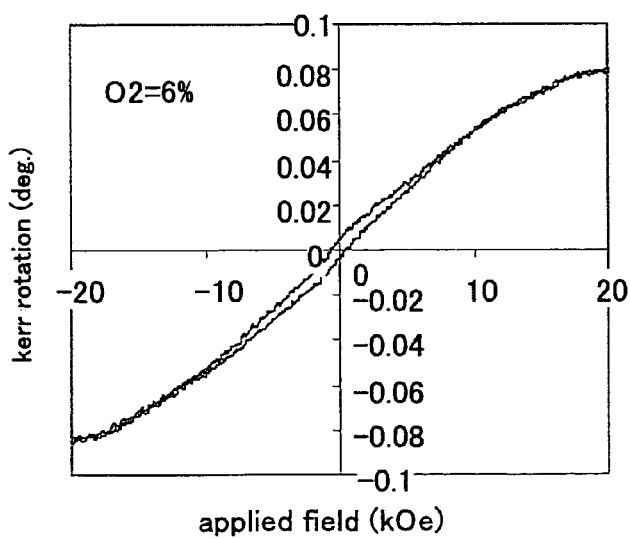
Figure 19A:
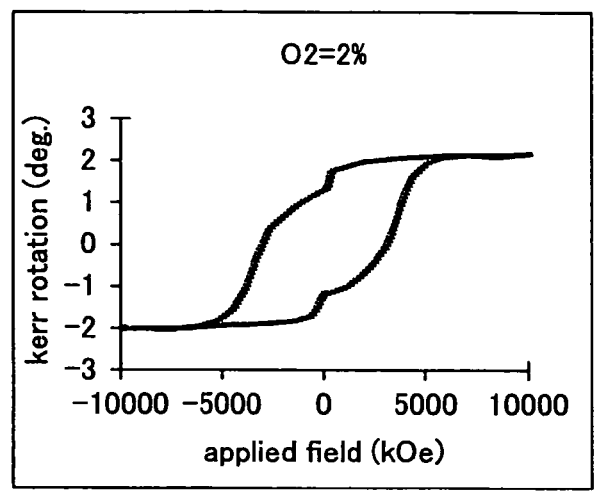
FIGS. 19A through 19C are diagrams showing the $O_2$ partial pressure dependence of in-plane M-H loops for the modification of the third embodiment when reactively sputtering the AlRu seed layer.
Figure 19B:
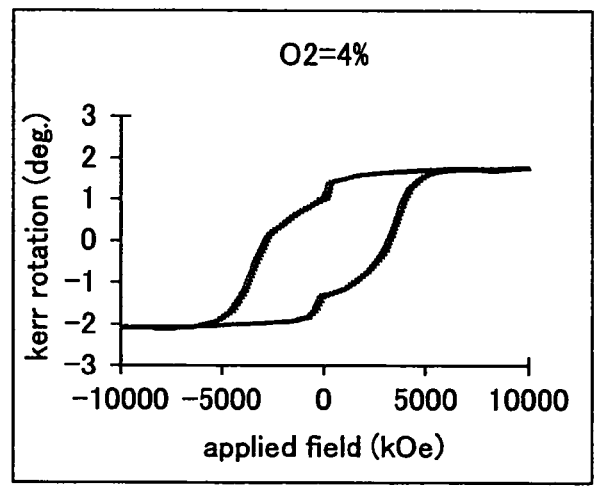
Figure 19C:
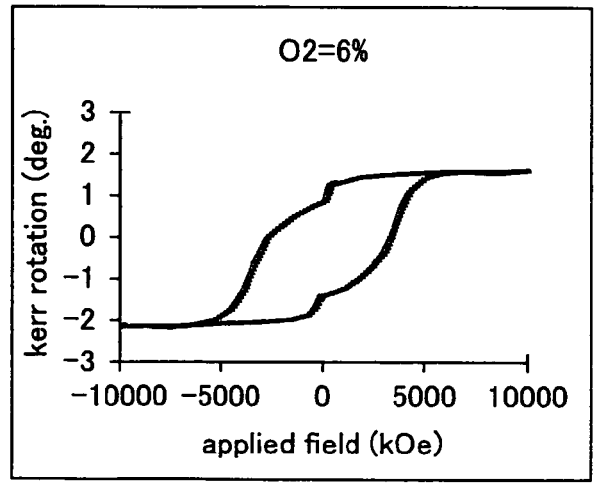

FIG. 17 is a diagram showing an isolated signal-to-medium noise ratio Siso/Nm comparison of the second modification of the second embodiment of the magnetic recording medium and a 35 Gbit/in$^2$ magnetic recording medium evaluated at F2=330 kfci recording density. In FIG. 17, the ordinate indicates a ratio $\Delta$S/Nm of the isolated signal-to-medium noise ratio Siso/Nm of the second modification of the second embodiment of the magnetic recording medium to that of the 35 Gbit/in$^2$ magnetic recording medium, and the abscissa indicates the $O_2$ partial pressure $P_O$ (%) when the AlV seed layer 13 is reactively sputtered. FIG. 17 shows media performances on both isotropic and glass direct textured glass substrates, where "♦" shows the media performance on the isotropic glass substrate 11 and "■" shows the media performance on the glass direct textured glass substrate 11.

As is clear from the FIG. 17, the media performance is far superior for the second modification of the second embodiment, and is a suitable candidate for magnetic recording media having recording densities over 50 Gbit/in$^2$ and even over 100 Gbit/in$^2$. FIG. 17 also shows that if the AlV seed layer 13 is deposited on the glass direct textured glass substrate 11, the isolated signal-to-noise ratio Siso/Nm performance is further enhanced.

Next, a description will be given of a modification of the third embodiment shown in FIG. 6, where the underlayer 14 is made of AlRu and has a thickness of 5 nm to 30 nm, and the seed layer 13 is made of AlV reactively sputtered with $O_2$ in an Ar+$O_2$ gas mixture at a $O_2$ partial pressure $P_O$=2% to 6% and has a thickness of 5 nm to 30 nm. It is assumed that the substrate 11 is made of glass, the lattice matching layer 15 is made of CrMo, the hcp interlayer 16 is made of CoCrTa, and the magnetic layers 17-a and 17-b are made of CoCrPtBCu.

FIGS. 18A through 18C and FIGS. 19A through 19C respectively are diagrams showing the $O_2$ partial pressure dependence of perpendicular (out-of-plane) and in-plane M-H loops for this modification of the third embodiment shown in FIG. 6 when reactively sputtering the AlRu seed layer. In FIGS. 18A through 19C, the ordinate indicates the Kerr rotation (degrees), and the abscissa indicates the applied field (kOe). Further, in FIGS. 18A and 19A, 18B and 19B, and 18C and 19C, the $O_2$ partial pressures $P_O$ respectively are 2%, 4% and 6%. The lattice matching layer 15 has a thickness of 20 nm, the hcp interlayer 16 has a thickness of 1 nm, the magnetic layers 17-a and 17-b respectively have thicknesses of 2 nm and 16 nm, and the Ru spacer layer 20 has a thickness of 0.9 nm.

It was confirmed from FIGS. 18A through 19C that the IPO is maintained well for this modification having the $O_2$ partial pressure $P_O$ in the range of 2% to 6%. Hence, it was confirmed that the IPO is best for the $O_2$ partial pressure $P_O$=6% for this particular case. Comparing this modification with the above described example of the magnetic recording medium having the glass substrate, the NiP seed layer, the Cr(002) underlayer, the CoCr intermediate layer and the magnetic layer, the AlV seed layer 13 can be reactively sputtered with $O_2$ in an Ar+$O_2$ gas mixture at a suitable partial pressure $P_O$ to obtain the IPO which is improved compared to this example of the magnetic recording medium.

According to experiments conducted by the present inventor, it was found that the IPO is improved when the AlV seed layer 13 is reactively sputtered with $O_2$ in an Ar+$O_2$ gas mixture at a $O_2$ partial pressure $P_O$ in the range of 2% to 6%. Similarly, it was also found that the IPO can similarly be improved when the AlV seed layer 13 reactively sputtered with $P_2$ in an Ar+$P_2$ gas mixture at an $P_2$ partial pressure $P_N$ in the range of 2% to 6%.

However, when actually producing the magnetic recording media, the total thickness of the seed layer 13 and the underlayer 14 is preferably approximately 20 nm to 70 nm. Thus, reactively sputtering the AlV seed layer 13 with $N_2$ in an Ar+$N_2$ gas mixture or with $O_2$ in an Ar+$O_2$ gas mixture at a suitable $N_2$ or $O_2$ partial pressure $P_{N,O}$=1% to 20% proved to be very effective in this total thickness region. Also, the IPO is better than that of the NiP seed layer on glass and can match AlRu seed layer or used in conjunction with other pre-seed layers. This preferred range of thicknesses for the seed layer 13 and the underlayer 14 can be deposited in just two chambers and reduces the drop in glass substrate temperature during deposition of subsequent layers. The seed layer and underlayer combination hence allows for a wide range of process temperatures. For example, the seed layer 13 can be deposited between room temperature and 300° C. and the underlayer 14 can be deposited at a similar temperature range.

According to experiments conducted by the present inventor, it was found that superior signal-to-noise (S/N) performance is obtained for higher density recording above 100 Gbits/in$^2$ for both cases where the AlRu seed layer and AlV underlayer combination or, the AlV seed layer and AlRu underlayer combination is used. It was confirmed that the seed layer and underlayer combination helps obtain a good Co(11$\bar{2}$0) epitaxial growth of the subsequent magnetic layer 17 (or 17-a and 17-b) with small grain sizes and excellent in-plane orientation (h≦0.12) for the c-axis in the magnetic recording layer 17.

Figure 20:
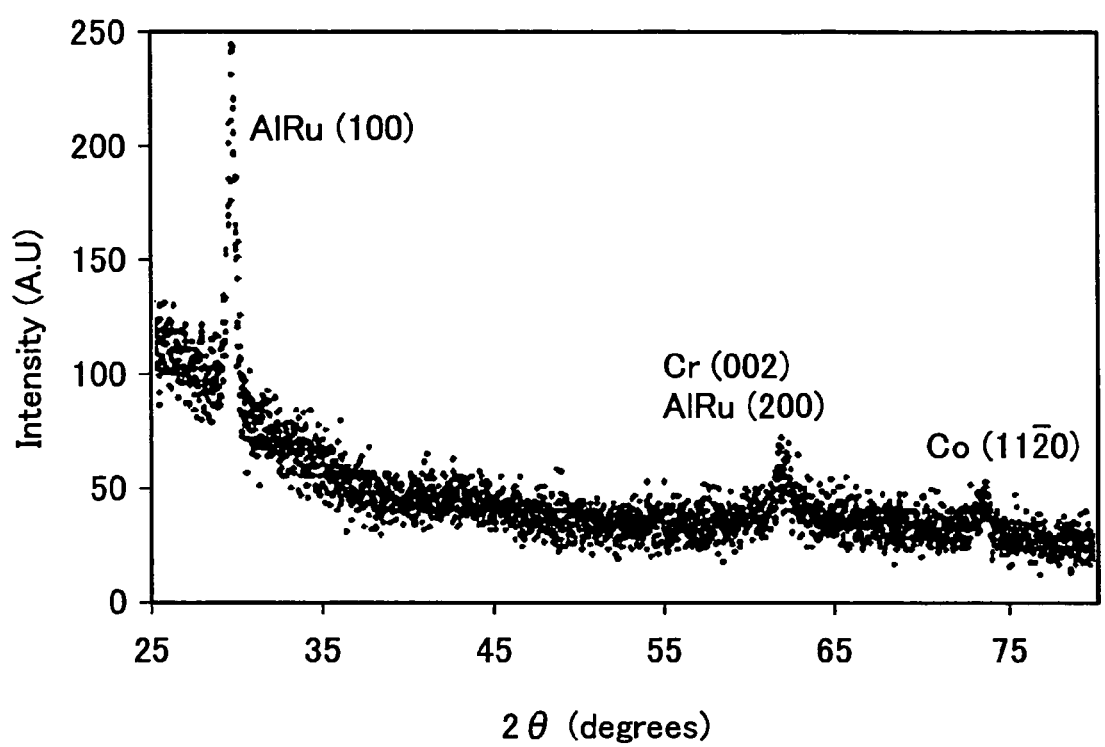
FIG. 20 is a diagram showing an XRD spectrum of a magnetic recording medium using AlV as the seed layer and AlRu as the underlayer.

FIG. 20 is a diagram showing an XRD spectrum of the magnetic recording medium using AlV as the seed layer and AlRu as the underlayer. In FIG. 20, the ordinate indicates the X-ray diffraction intensity in arbitrary units (A.U.), and the abscissa indicates 2θ (degrees). The peak position corresponding to Cr(002) and AlRu(200) matches well at 2θ~62°. In addition, a Co(11$\bar{2}$0) peak as well as an AlRu(100) peak are also indexed.

For an AlV layer with the use of an AlV—N layer as seed, XRD spectrum showed a (002) peak corresponding to 2θ=62°

($\lambda$=1.54). There was a broad peak also near $2\theta$=27° ($\lambda$=1.54), indicating that either the AlV layer is amorphous or the grains thereof are small and uncorrelated with each other. The seed layer and underlayer combination of the present invention showed a distinct XRD signature and the subsequent AlV layer deposited exhibited a (002) peak, with the magnetic layer 17 showing a strong distinct ($11\bar{2}0$) texture ($2\theta$=74°).

It was preferable that if AlV is used as the seed layer 13, this AlV seed layer 13 is reactively sputtered in an Ar+N$_2$ or Ar+O$_2$ gas mixture at N$_2$ or O$_2$ partial pressure $P_{N,O}$=1% to 20% in order to obtain good in-plane orientation. If AlV is used as the underlayer 14, then the sputtering can be done with no N$_2$ or O$_2$.

Therefore, in the case of the third embodiment employing the SFM structure, a good thermal stability at a reduced Mrt value (remanent magnetization and thickness product) due the antiparallel configuration was maintained and further enhanced by the improved IPO.

By using the above seed layer and underlayer combination, the grain diameters in the magnetic layer 17 can be controlled to be approximately 5 nm to 8 nm. This reduced grain diameter also contributes to the high signal-to-noise (S/N) ratio and high recording density which are achieved.

Much of the experiments conducted by the present inventor were made for a CoCrPtB magnetic layer which from a crystallographic viewpoint may not be so different from the CoCrPt alloy employed by Oh et al., "A Study on VMn underlayer in CoCrPt Longitudinal Media", IEEE Trans. Magn., vol. 37, pp. 1504-1507, 2001. Though magnetic layers with boron are also expected to be similar, the crystallographic orientation behavior is sensitive to the presence or absence of a Cr alloy between the AlV or AlRu underlayer and the magnetic layer.

As a consequence of the IPO improvement with the proper seed layer and underlayer combination, the kink in SFM magnetization curve is more pronounced in the case of the third embodiment shown in FIG. 6. This was clearly observed in many experiments, where typical synthetic antiferromagnetically coupled magnetic recording media were produced on the seed layer and underlayer combination. Also, because of this increase in the IPO, the interlayer exchange coupling increases between two magnetic layers (17-*a* and 17-*b*). Apart from that, not only are read-write properties of the magnetic recording media improved but this also makes it easier to measure the exchange coupling between the magnetic layers (17-*a* and 17-*b*) which is very useful for mass production control.

It should be noted that since the advancement of sputtering processes are changing rapidly, it is possible to deduce the above structures with sputtering from different pure elemental targets in a multicathode assembly sputtered simultaneously. Suitably adjusting the power ratios and adjusting the angle of deposition, its easy to produce the above mentioned results.

More layers may be added to the media structure described above such as a pre-seed layer on the substrate under the seed layer, so as to further improve the performance of the above described embodiments. In addition, the seed layer and underlayer combination may be realized by use of materials other than AlV and AlRu. Furthermore, the seed layer and underlayer combination may be realized by AlV and AlRu alloys which are predominantly AlV and AlRu, respectively.

The magnetic diskc according to the present invention also shows preferable underlayer and magnetic layer orientation by either a mechanical circumferential texturing of the substrate or a mechanical circumferential texturing of the pre-seed layer.

As far as the composition of the AlV are concerned, from the binary alloy diagrams, many phases of AlV has been identified in the past. Based on the different AlV intermetallic phase identified from various studies and lattice parameter data, the solubility of V in Al at 620° C. is about 0.2 at. %. A maximum paramagnetic susceptibility can be used to estimate a maximum solubility of V in Al, namely, 0.3 at. %. The solubility of V in Al can be extended metastably to 0.6 at. % by solidification at rates of 5×10$^{4°}$ C./s. However in the case of thin film structures made by sputtering, there are not many studies carried out on these materials, especially AlV. Though there are many intermetallic compounds detected of Al and V, when it is sputtered to form thin films, the alloy formed, at almost all of the compositions studied by the present inventor, seems to form a BCC structure which somewhat matches with the lattice dimension of Cr (002) and subsequent Co($11\bar{2}0$) texture. It may therefore be regarded that, all AlV compositions formed are useful for magnetic recording application especially in terms of the lattice matching, epitaxial growth and excellent IPO.

Figure 21:
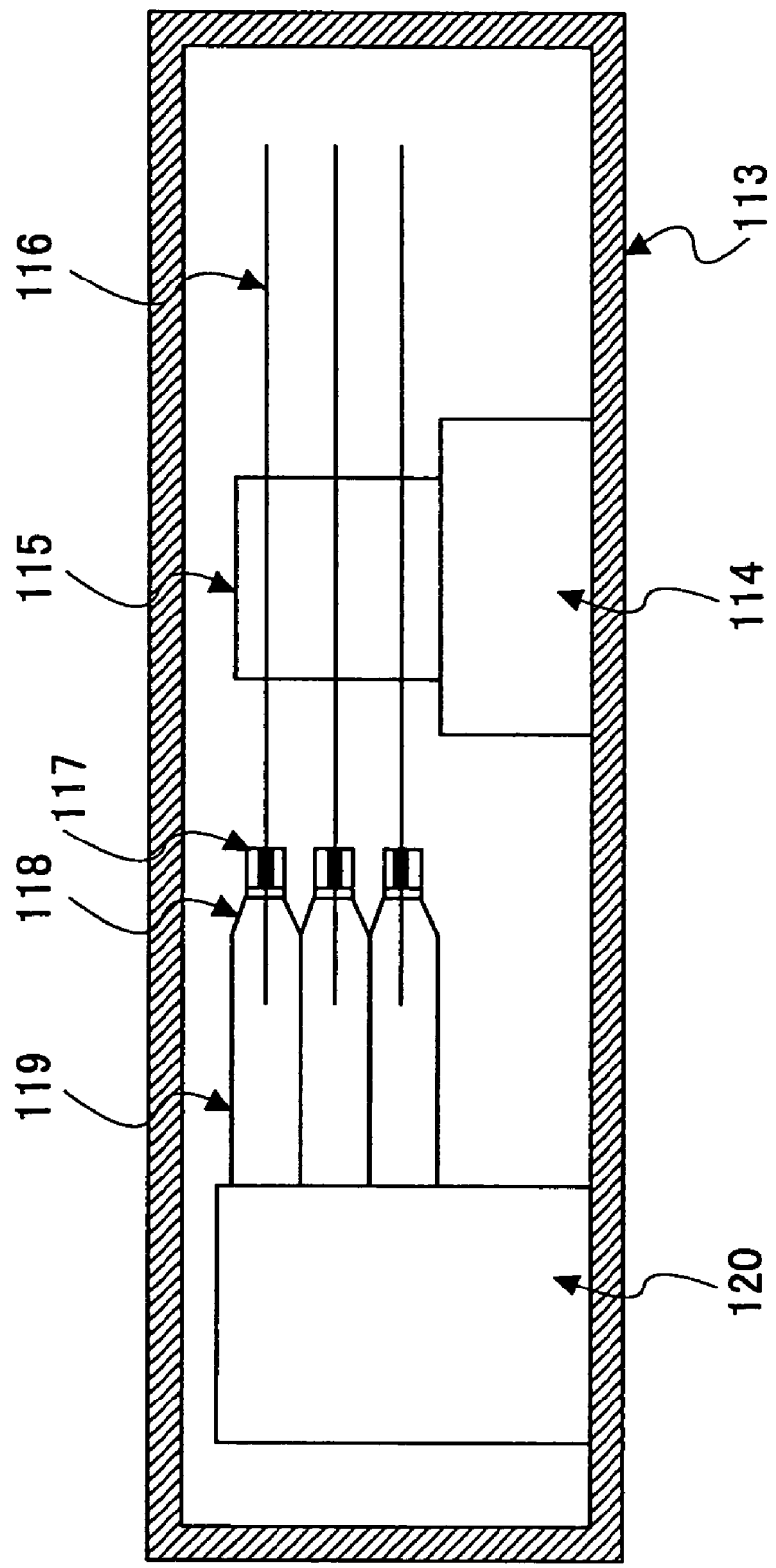
FIG. 21 is a cross sectional view showing an important part of this embodiment of the magnetic storage apparatus.

Next, a description will be given of an embodiment of a magnetic storage apparatus according to the present invention, by referring to FIGS. 21 and 22. FIG. 21 is a cross sectional view showing an important part of this embodiment of the magnetic storage apparatus, and FIG. 22 is a plan view showing the important part of this embodiment of the magnetic storage apparatus.

Figure 22:
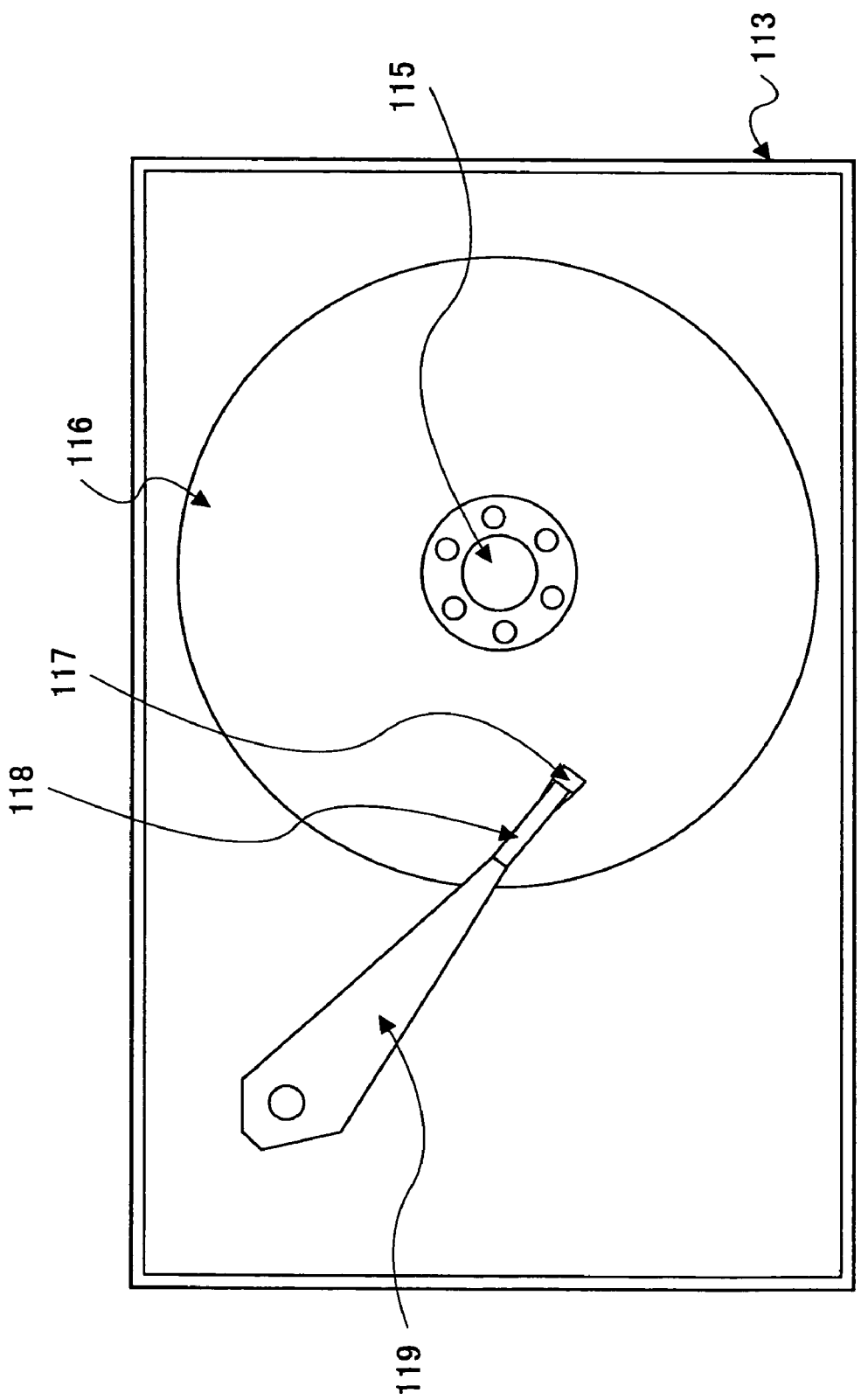
FIG. 22 is a plan view showing the important part of the embodiment of the magnetic storage apparatus.

As shown in FIGS. 21 and 22, the magnetic storage apparatus generally includes a motor 114, a hub 116, a plurality of magnetic recording media 116, a plurality of recording and reproducing heads 117, a plurality of suspensions 118, a plurality of arms 119, and an actuator unit 120 which are provided within a housing 113. The magnetic recording media 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments described above described in conjunction with FIGS. 4 through 20. The number of magnetic recording media 116 is not limited to three and only two or four or more magnetic recording media 116 may be provided.

The basic construction of the magnetic storage apparatus is not limited to that shown in FIGS. 21 and 22. In addition, the magnetic recording medium used in the present invention is not limited to a magnetic disk, and the magnetic recording medium may take the form of a magnetic tape, a magnetic card or the like.

Moreover, although the embodiments described above are specifically for rigid glass substrates, the present invention may be similarly applied to other substrates such as metal, polymer, plastic, or ceramic flexible and rigid substrates and still not depart from the spirit of the present invention.

Therefore, according to the present invention, it is possible to reduce grain sizes of the underlayer and the magnetic recording layer, and promote desired orientation of the magnetic recording layer, by the provision of the seed layer and underlayer combination. As a result, it is possible to realize a magnetic recording medium having an improved performance, even when the underlayer is formed using the multicathode system. Of course, when the single-cathode system is used to form the underlayer, the grain sizes of the underlayer and the magnetic recording layer can similarly be reduced to promote the desired orientation of the magnetic recording layer by the provision of the seed layer.

Further, the present invention is not limited to these embodiments, but various variations and modifications may be made without departing from the scope of the present invention.

What is claimed is:

1. A magnetic recording medium comprising:
   a seed layer made of one of AlRu and AlV;
   a magnetic recording layer made of a CoCr alloy; and
   an underlayer made of the other of AlRu and AlV, said underlayer being disposed between the seed layer and the magnetic recording layer.

2. The magnetic recording medium as claimed in claim 1, wherein a total thickness of said seed layer and said underlayer is in a range of approximately 20 nm to 70 nm.

3. The magnetic recording medium as claimed in claim 1, wherein said seed layer has a thickness in a range of approximately 5 nm to 50 nm, and said underlayer has a thickness in a range of approximately 2 nm to 50 nm.

4. The magnetic recording medium as claimed in any of claim 1, wherein said seed layer is reactively sputtered in an $Ar+N_2$ or $Ar+O_2$ gas mixture at $N_2$ or $O_2$ partial pressure $P_{N,O}=1\%$ to 20%.

5. The magnetic recording medium as claimed in claim 1, further comprising:
   a substrate made of glass or Al,
   said seed layer being disposed on said substrate.

6. The magnetic recording medium as claimed in claim 5, wherein said substrate is mechanically textured.

7. The magnetic recording medium as claimed in claim 1, wherein the said magnetic recording layer is made up of a single magnetic layer or a synthetic ferrimagnetic structure, said synthetic ferrimagnetic structure being made up of at least two antiferromagnetically coupled CoCr alloy magnetic layers, wherein c-axes of CoCr alloy magnetic layers are significantly parallel to a film plane thereof such that a ratio $h \leq 0.15$ stands, where $h=Hc\perp/Hc$, $Hc\perp$ denotes perpendicular coercivity, and Hc denotes coercivity along the film plane.

8. The magnetic recording medium as claimed in claim 1, further comprising:
   a Cr-M lattice matching layer having a thickness of approximately 1 nm to 15 nm formed directly on said underlayer and disposed between said underlayer and said magnetic recording layer, where M is a material selected from a group consisting of Mo, Ti, V, and W of atomic proportion greater than or equal to 5%.

9. The magnetic recording medium as claimed in claim 8, further comprising:
   an interlayer made of a slightly magnetic or nonmagnetic hcp structured CoCr alloy having a thickness of approximately 1 nm to 5 nm and disposed between said Cr-M lattice matching layer and said magnetic recording layer.

10. The magnetic recording medium as claimed in claim 1, further comprising:
    a lattice matching layer made essentially of Ru having a thickness of approximately 1 nm to 3 nm in direct contact with said magnetic recording layer and disposed between said underlayer and said magnetic recording layer.

11. A magnetic storage apparatus comprising:
    at least one magnetic recording medium comprising a seed layer made of one of AlRu and AlV, a magnetic recording layer made of a CoCr alloy, and an underlayer made of the other of AlRu and AlV and disposed between the seed layer and the magnetic recording layer; and
    a head which writes information on and/or reproduces information from the magnetic recording medium.

12. The magnetic storage apparatus as claimed in claim 11, wherein said magnetic recording medium is a magnetic disk.

* * * * *